April 14, 1964     J. PAISLEY     3,128,890
APPARATUS FOR STACKING OR SETTING UP BRICKS
Filed Sept. 26, 1960     20 Sheets-Sheet 1
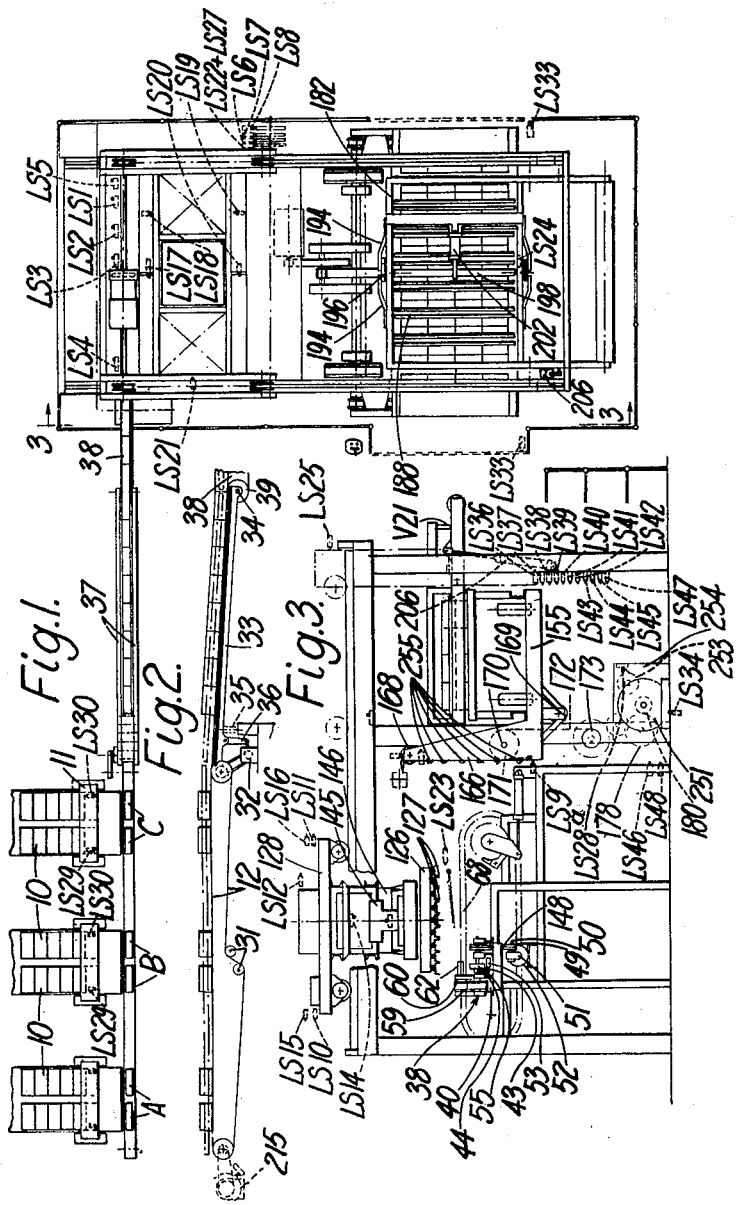
INVENTOR
John Paisley
by
Watson, Cole, Grindle & Watson
ATTORNEYS

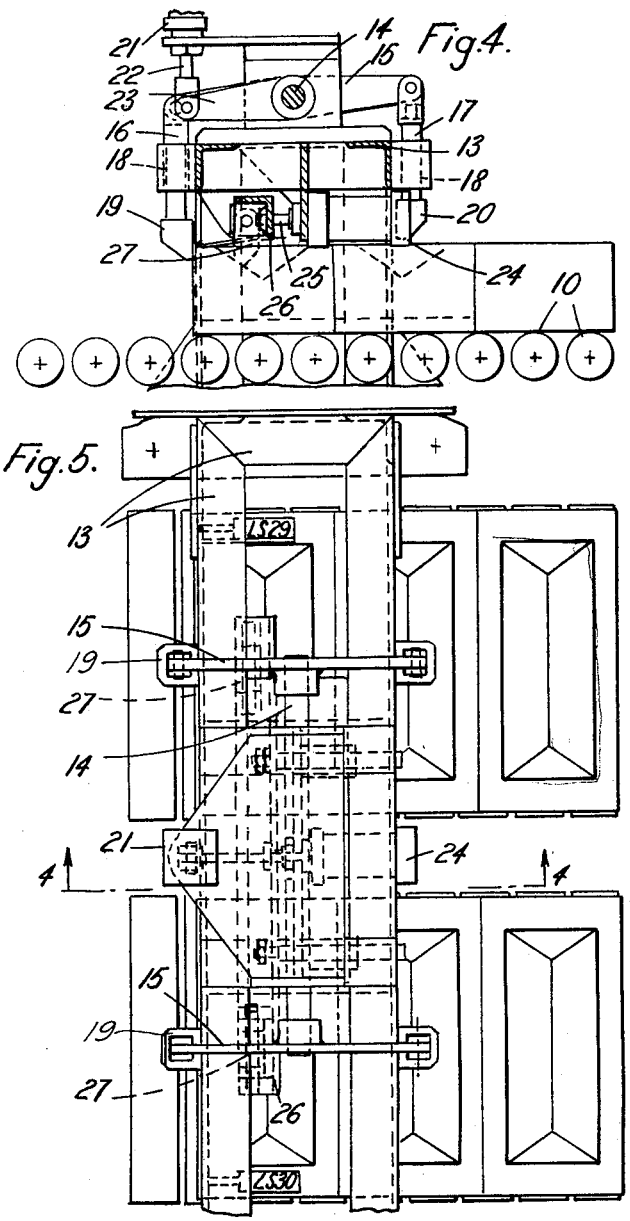

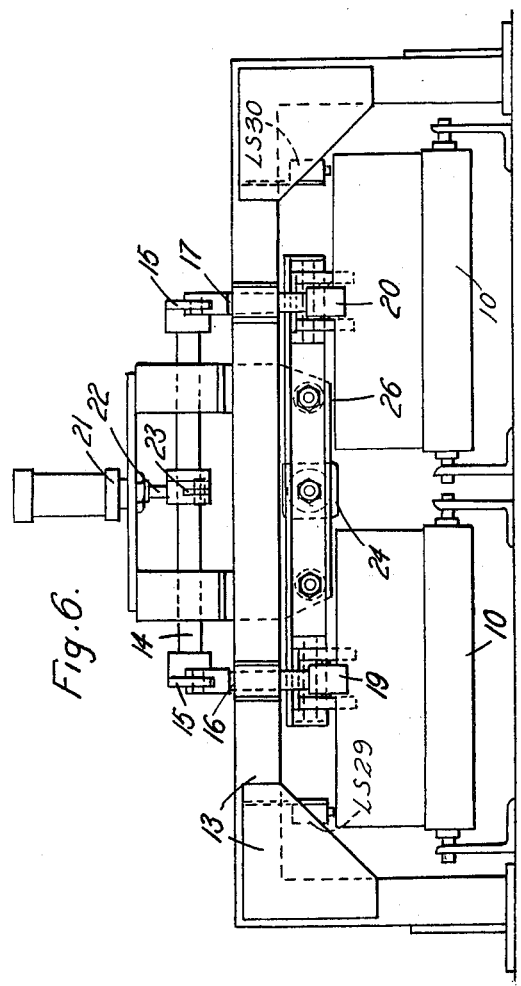

April 14, 1964  J. PAISLEY  3,128,890
APPARATUS FOR STACKING OR SETTING UP BRICKS
Filed Sept. 26, 1960  20 Sheets-Sheet 4
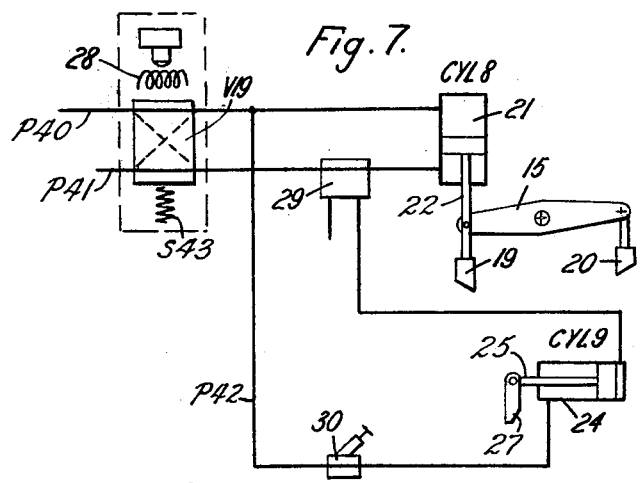
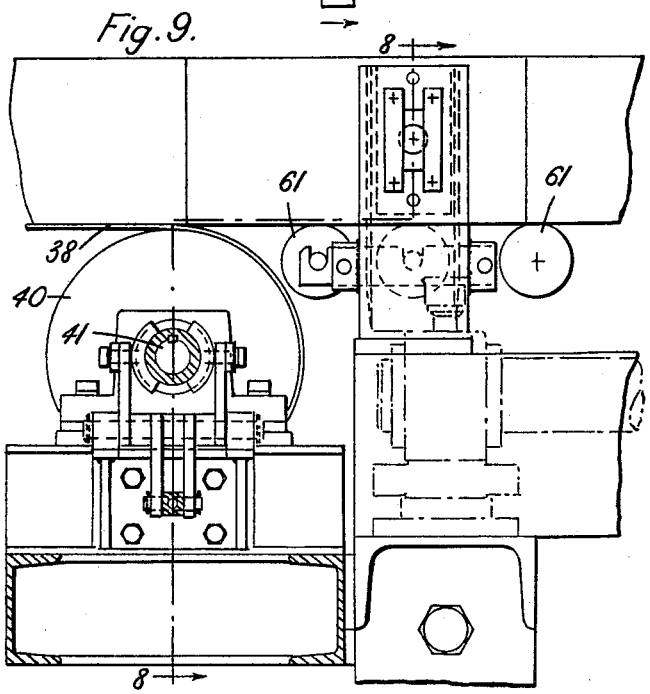
INVENTOR
John Paisley
BY
Watson, Cole, Grindle & Watson
ATTORNEYS

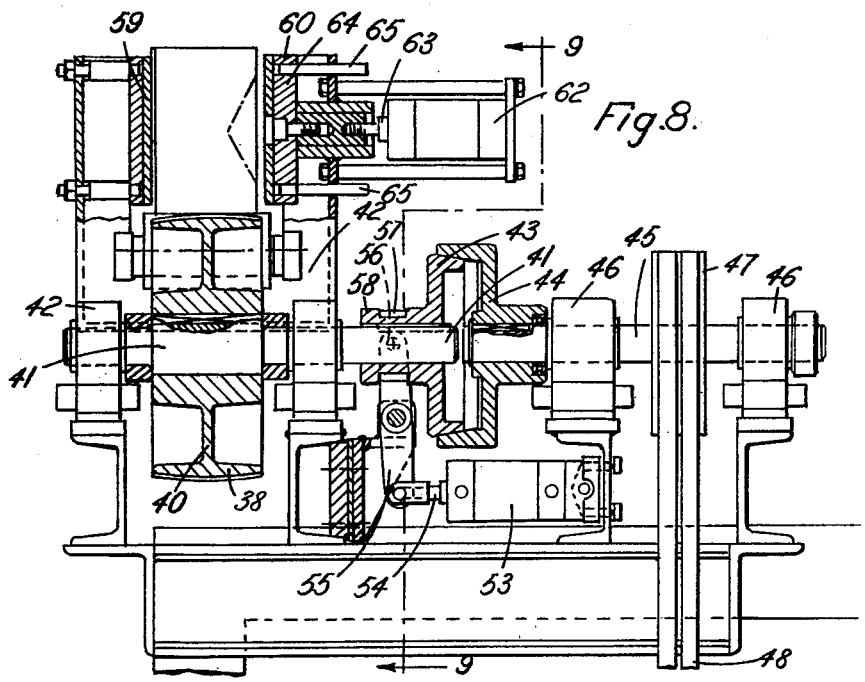
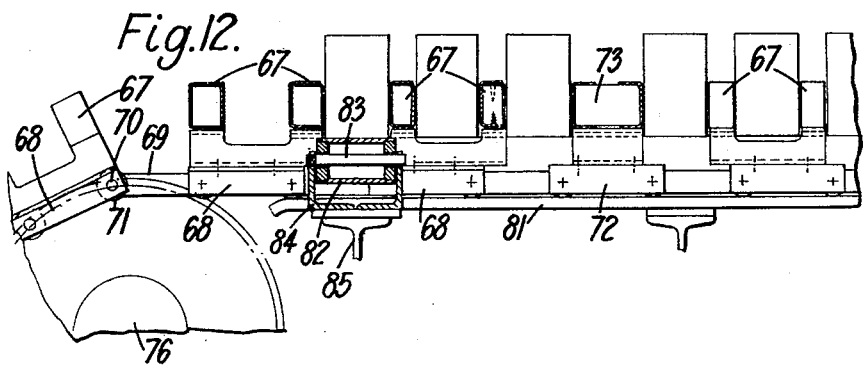

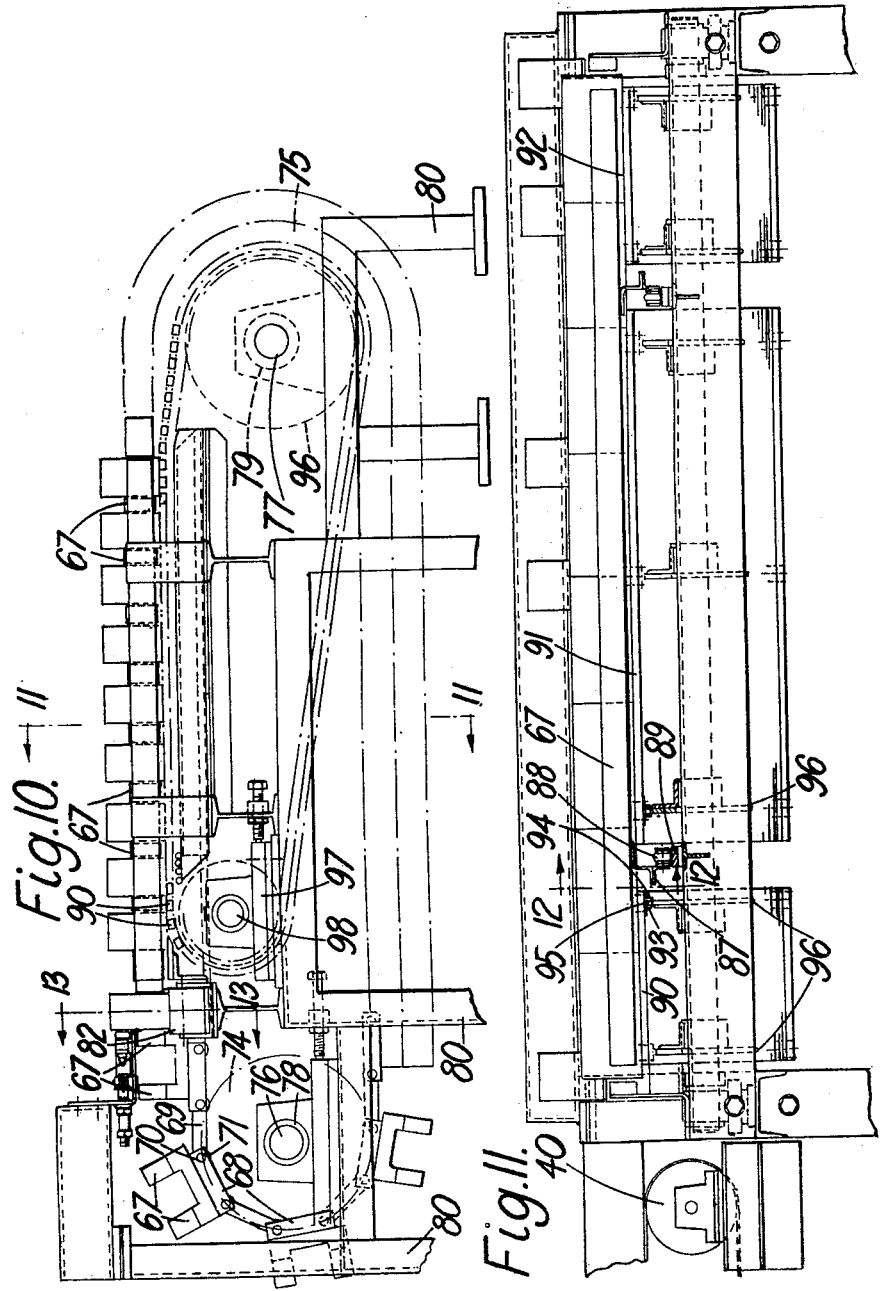

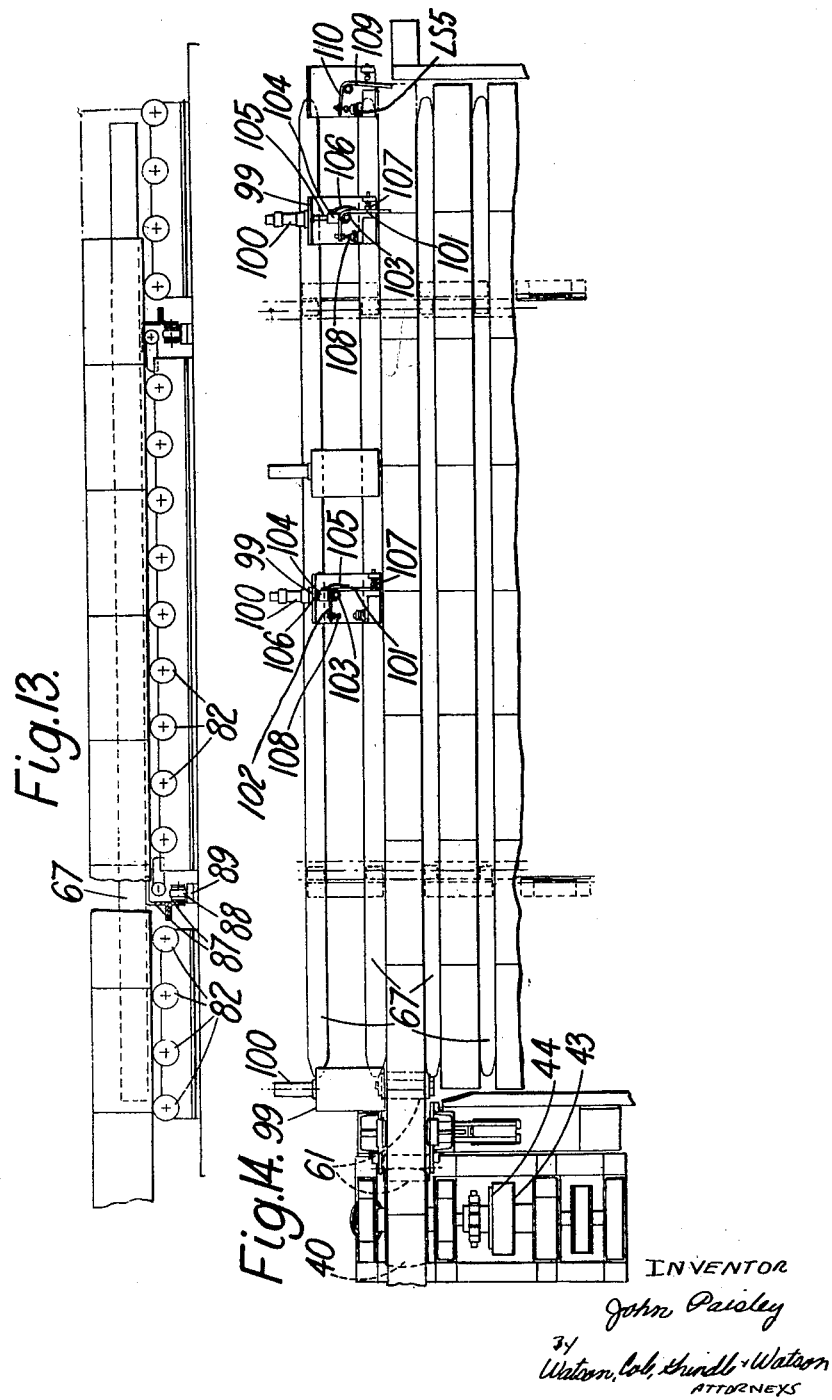

April 14, 1964    J. PAISLEY    3,128,890
APPARATUS FOR STACKING OR SETTING UP BRICKS
Filed Sept. 26, 1960    20 Sheets-Sheet 8

INVENTOR
John Paisley
BY
Watson, Cole, Grindle & Watson
ATTORNEYS

INVENTOR
John Paisley
BY
Watson, Cole, Grindle & Watson
ATTORNEYS

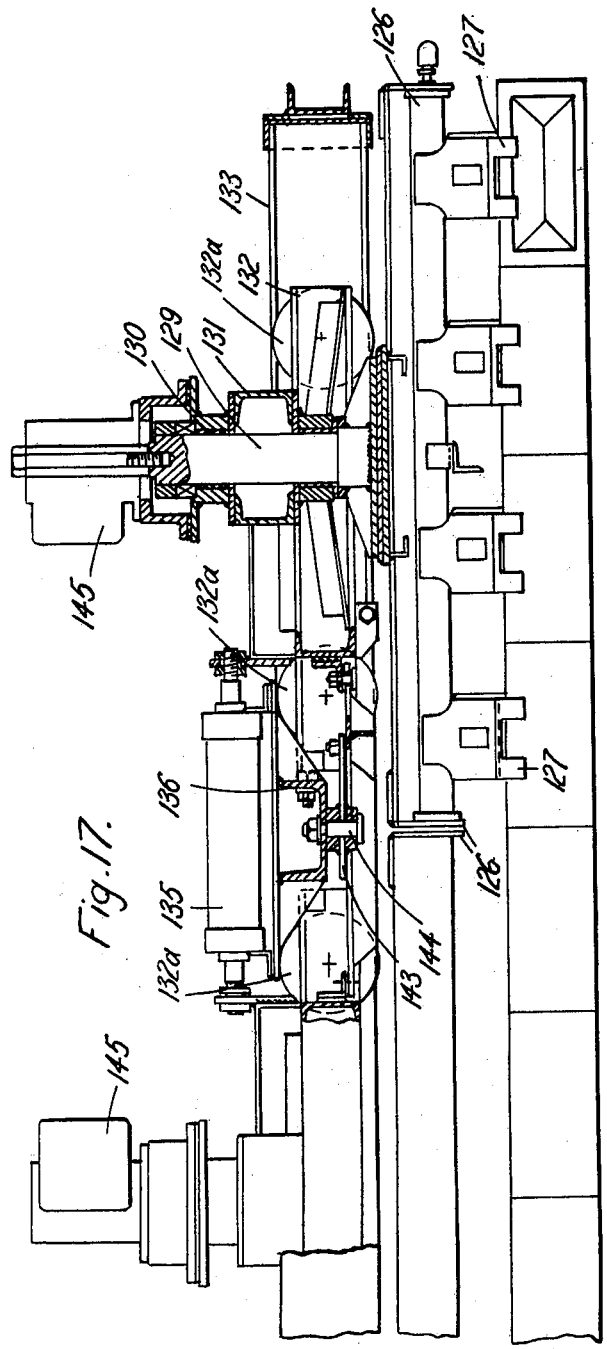

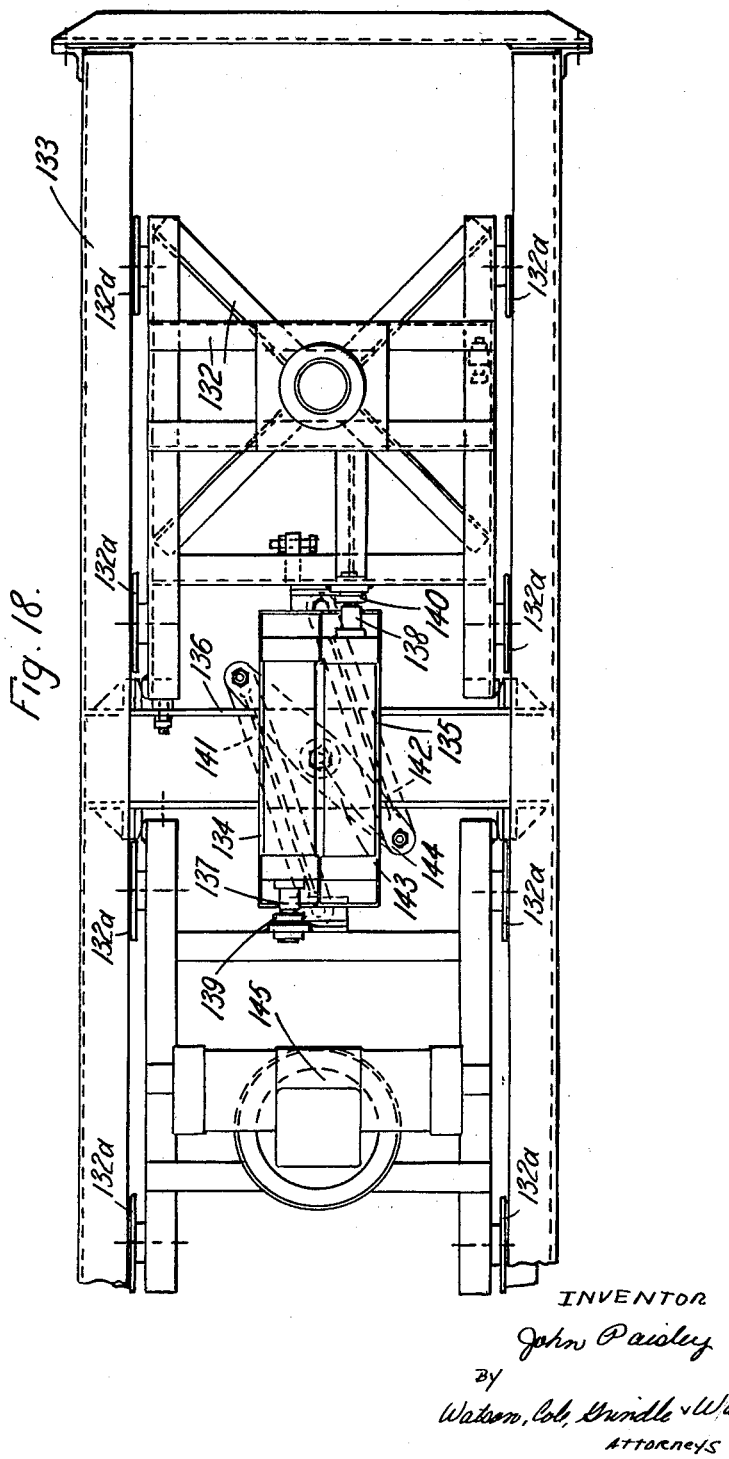

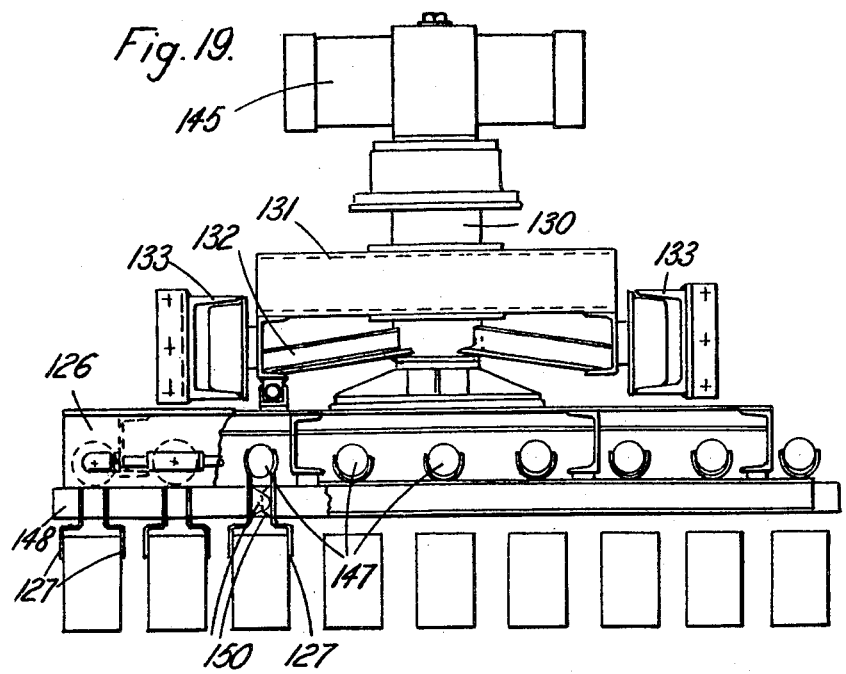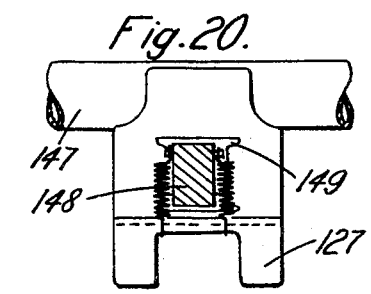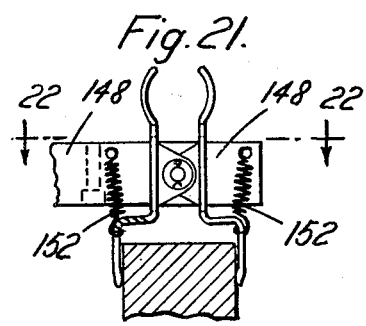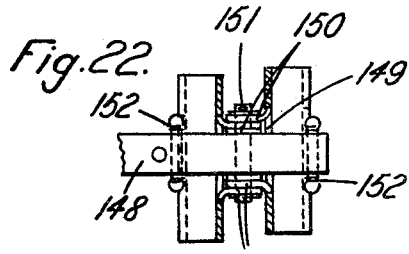

April 14, 1964            J. PAISLEY            3,128,890
APPARATUS FOR STACKING OR SETTING UP BRICKS
Filed Sept. 26, 1960            20 Sheets-Sheet 14
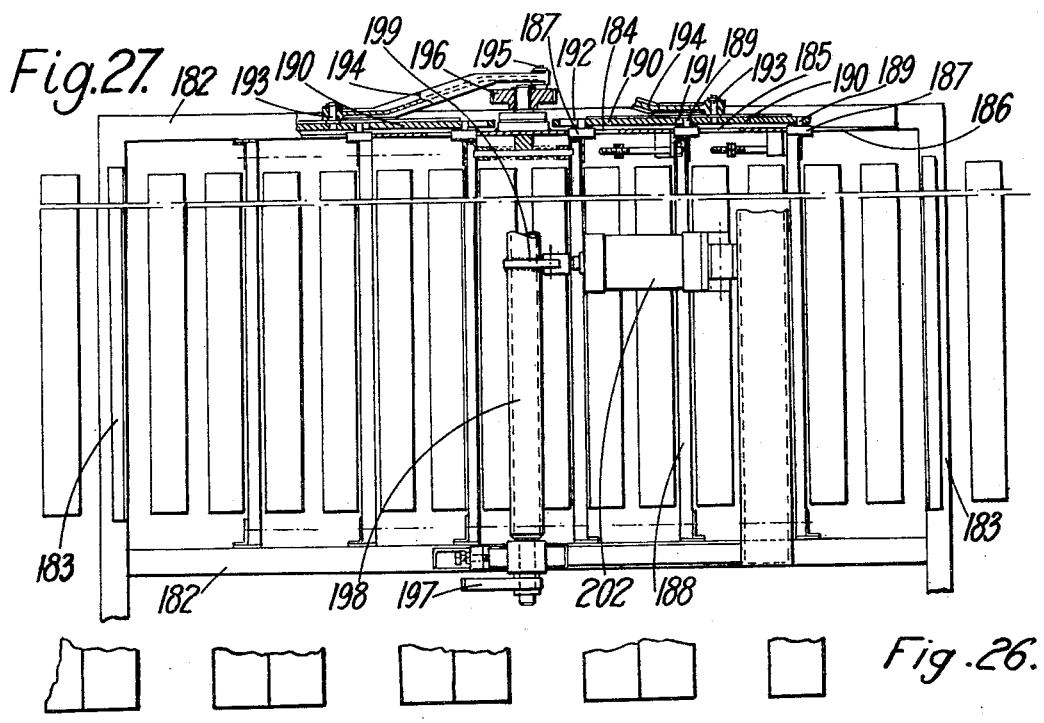
INVENTOR
John Paisley
BY
Watson, Cole, Grindle & Watson
ATTORNEYS

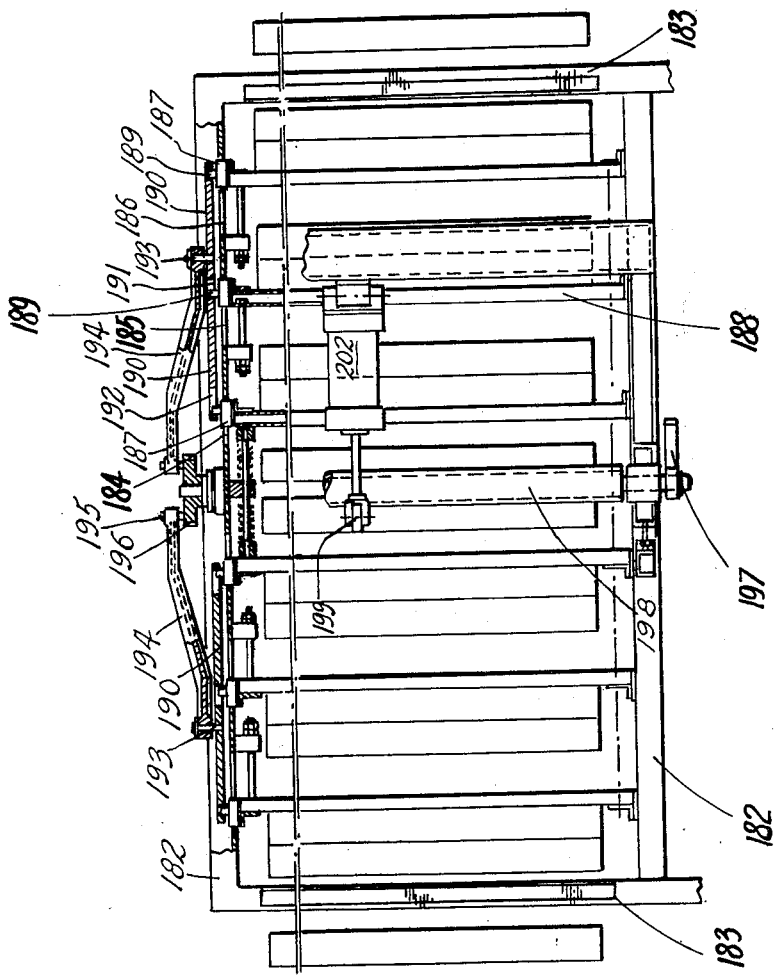

April 14, 1964  J. PAISLEY  3,128,890
APPARATUS FOR STACKING OR SETTING UP BRICKS
Filed Sept. 26, 1960  20 Sheets-Sheet 16
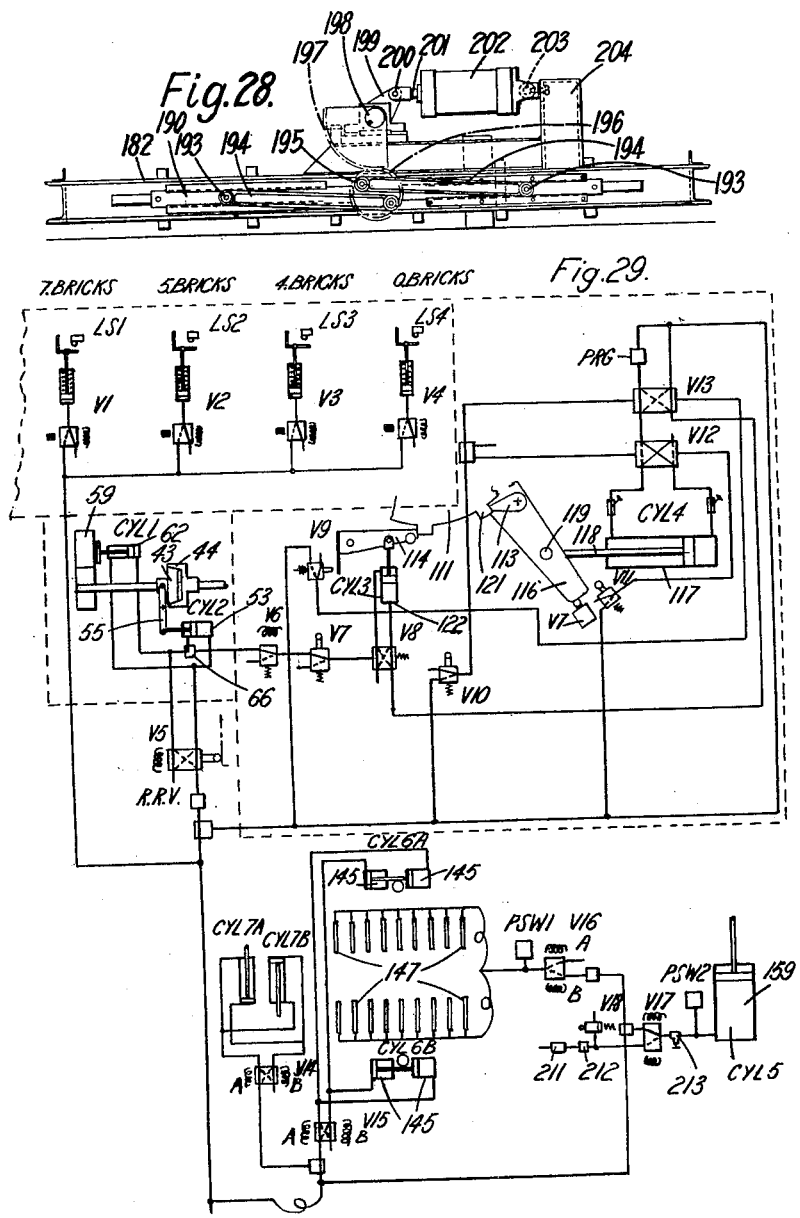
INVENTOR
John Paisley
by
Watson, Cole, Grindle & Watson
ATTORNEYS April 14, 1964  J. PAISLEY  3,128,890
APPARATUS FOR STACKING OR SETTING UP BRICKS
Filed Sept. 26, 1960  20 Sheets-Sheet 17

INVENTOR
John Paisley
BY
Watson, Cole, Grindle & Watson
ATTORNEYS

April 14, 1964  J. PAISLEY  3,128,890
APPARATUS FOR STACKING OR SETTING UP BRICKS
Filed Sept. 26, 1960  20 Sheets-Sheet 19
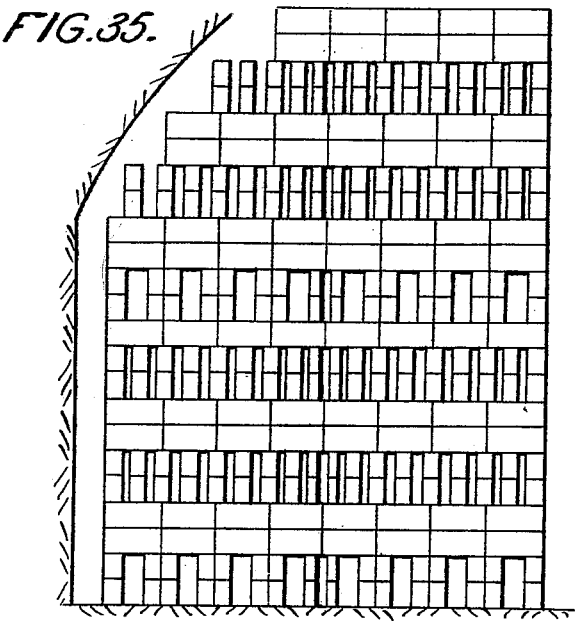
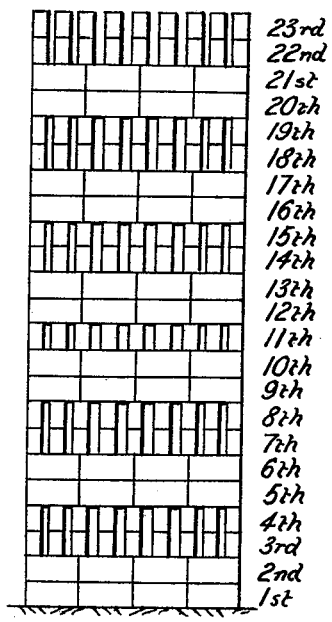

April 14, 1964     J. PAISLEY     3,128,890
APPARATUS FOR STACKING OR SETTING UP BRICKS
Filed Sept. 26, 1960     20 Sheets-Sheet 20
FIG.37.     FIG.38.
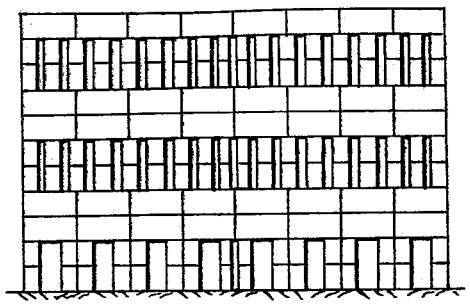
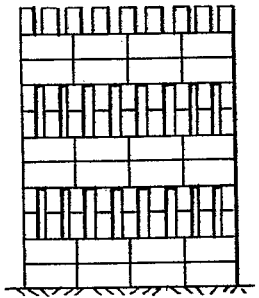
FIG.39.     FIG.40.
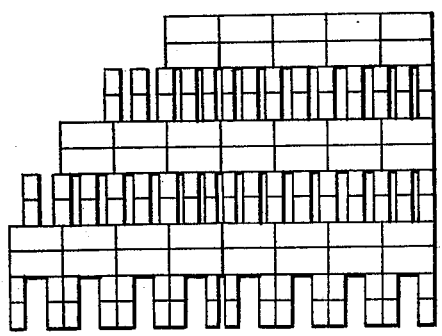
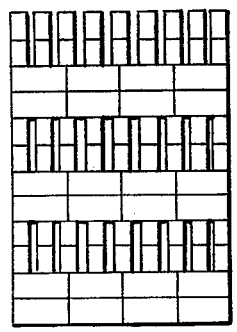
INVENTOR
John Paisley
BY
Watson, Cole, Grindle & Watson
ATTORNEYS

United States Patent Office

3,128,890
Patented Apr. 14, 1964

3,128,890
APPARATUS FOR STACKING OR SETTING UP BRICKS
John Paisley, London, England, assignor to Eastwoods Limited, London, England, a company of Great Britain
Filed Sept. 26, 1960, Ser. No. 58,246
2 Claims. (Cl. 214—6)

This invention relates to apparatus for stacking or setting-up bricks. Briefly the manufacture of building bricks usually comprises forming the green clay into bricks, for example by a pressing operation, transporting the green bricks to a kiln where they are stacked on one another within the kiln in a particular manner in accordance with the internal shape and dimensions of the kiln and so that the surfaces of every brick are adequately exposed to the hot gases and after a predetermined baking period and cooling period drawing the bricks from the kiln and loading them on lorries for transport.

In order to release any moisture and in order that there may be adequate penetration of heat into the stack it is necessary to set the bricks in an open pattern with a space between them which also gives stability to the setting for the full height of the chamber of the kiln. Thus the bricks in adjacent courses are arranged at an appropriate angle to one another, so that with the exception of the lowermost course, each brick in every course rests on parts of two bricks on the course below it. The present invention is concerned with that type of brick setting.

It is already known that instead of stacking or setting up the bricks while in the kiln, to set them up in batches outside the kiln, for example in the press shed where the green clay is formed into bricks and then to transport the batches by trucks successively into the kiln where they may be disposed by a fork lift truck side by side and on top of one another. Thus in the case where the roof of the kiln is arched the upper batches require to be set up to conform with this shape.

As indicated above the setting up of bricks so that in adjacent rows they are arranged at an angle to one another, results in the production of a stable stack. Thus the invention is applicable not only to the setting up for stacking of building bricks but also to any rectangular articles of substantially the same size which may be required to be stacked and the term "bricks," used throughout the specification, is intended to include rectangular articles such as packages and cartons of a similar size.

This setting up of bricks in batches has heretofore usually been carried out by hand and an object of the present invention is to mechanise that step so that in the case of building bricks it may be carried out for example close to where the green bricks are formed.

According to this invention an apparatus for setting up bricks comprises a receiving platform, means for marshalling bricks on that platform in a predetermined number of spaced rows with a predetermined number of bricks in each row, a number of spaced rows of grippers one for each brick adjustably carried on a mounting above said platform, means for opening and closing said grippers, means for moving said mounting backwards and forwards between a position over said receiving platform and a location where a transporter is situated, means for effecting relative rotation between said grippers and transporter to a predetermined angular extent and means for effecting relative up and down movement between said mounting and said transporter or a carrier therefor so that a number of layers of spaced rows of bricks may be built up on said transporter by release from said grippers with the lengths of the bricks in one layer extending across and at a predetermined angle to the lengths of the bricks in an adjacent layer and so as to form an openwork stack with passages between the rows of bricks.

The term transporter is intended to include any means for carrying the stacked bricks away from the apparatus, such as, a trolley or truck or a conveyor.

Preferably means are provided for imparting up or down movement to said grippers simultaneously so that they may be lowered when in an open condition to straddle and close upon the bricks and are then raised and moved to said location where the transporter is situated, and after having been lowered towards said transporter they are opened.

The relative rotation between said grippers and transporter may be effected by the provision of means for rotating the grippers through said predetermined angular extent on said mounting, for example said grippers may be mounted in spaced rows on a number of frames which are rotatable about parallel axes on said mounting each through a predetermined angular extent and wherein the frames are also movable on the mounting in such a direction as to be brought clear of one another during their rotation and means for imparting such clearing movement and return movement.

Said frames may be arranged on said mounting so that their axes of rotation may be moved towards and away from one another.

The aforesaid up or down movement may be imparted simultaneously to the grippers by the provision of means for moving said mounting in an up and down direction relatively to said receiving platform.

The means for opening or closing the grippers may be conditioned by the up and down movement of the grippers so that as the grippers descend and approach the receiving platform they close over the bricks and when the grippers with bricks in them descend and approach the transporter they open to deposit the bricks on the previous layer.

The means for imparting clearing movement to said frames may automatically be brought into operation by means controlled by said relative up and down movement between said mounting and said transporter.

The rotation of the frames may be initiated by the outward movement of the frames to bring them clear of one another.

The inward movement of the frames towards one another may be initiated by rotational movement of the frame when approaching the end of their rotation.

The completion of a marshalled layer on the receiving platform may be arranged to condition means for lowering the grippers, and closing the grippers on the bricks marshalled on the receiving platform conditioning means for raising the grippers, and the means for again lowering the grippers may be conditioned by the movement of the grippers towards and over the transporter and the means for raising the grippers after depositing the bricks on to the transporter may be conditioned by the downward movement of the grippers.

The aforesaid means for effecting up and down movement between said mounting and said transporter or carrier comprises a lift which carries said transporter or carrier and is driven by a reversible electric motor controlled by a moving part of the apparatus.

The aforesaid motor may be brought into circuit with a source of supply so as to rotate in a direction to lower the lift by a moving part of a drive for the marshalling means after a layer of bricks has been finally marshalled and delivered on to the transporter or carrier, and the downward movement of which lift if arrested after a travel corresponding to the height of said layer by a cam on a shaft of a gear box comprising a part of a transmission between the motor and said lift and the reversal of the electric motor may be controlled by cam means driven by the transmission between the electric motor and a moving part of the lift.

The aforesaid transmission may comprise a driving shaft on which is fixed two gear wheels of different diameter which engage two other gear wheels of different diameter connected to a driven shaft by two unidirectional clutches of opposite sense, which driven shaft is connected to means for transmitting up and down movement to the lift.

The means for transmitting up and down movement to the lift may comprise a gear box, the input shaft of which comprises said driven shaft to which the two gear wheels are connected by the uni-directional clutches and the output shaft of which gear box drives a shaft having two wheels attached thereto and to each of which is connected a chain or belt which chains or belts pass around sprockets or pulleys on another shaft disposed above the lift structure and the ends of which chains or bolts are secured to a lifting platform.

The following is a description of one form of apparatus according to the invention, reference being made to the acocmpanying drawings in which:

FIGURE 1 is a plan view showing the general arrangement of the plant;

FIGURE 2 is a side elevation of the conveyor shown to the left of FIGURE 1 for feeding the bricks to the marshalling feed conveyor;

FIGURE 3 is a side view of the part of the apparatus to the right of FIGURE 1 looking in the direction of the arrows 3—3;

FIGURE 4 is a vertical section on the line 4—4 of FIGURE 5 through the sequencing mechanism for controlling the order of feeding of the bricks from the presses to the first endless band conveyor;

FIGURE 5 is a plan view of the arrangement shown in FIGURE 4;

FIGURE 6 is an elevation looking from the left of FIGURE 5;

FIGURE 7 is a pneumatic circuit diagram showing the manner in which the pneumatic motors operating the sequencing mechanisms are controlled;

FIGURE 8 is a vertical section through the marshalling feed conveyor on the cranked line 8—8 of FIGURE 9;

FIGURE 9 is a section on the line 9—9 of FIGURE 8;

FIGURE 10 is a side elevation of the marshalling conveyor;

FIGURE 11 is a vertical section on the line 11—11 of FIGURE 10;

FIGURE 12 is a vertical section on the line 12—12 of FIGURE 11;

FIGURE 13 is a part section on the line 13—13 of FIGURE 10 on a reduced scale;

FIGURE 14 is a plan view of the arrangement shown in FIGURE 13;

FIGURE 17 is a part vertical section and part elevation of the gripper frames and the structures which supports them;

FIGURE 18 is a plan of the arrangement shown in FIGURE 17;

FIGURE 19 is a view looking from the left of FIGURE 17;

FIGURE 20 is a side view of a pair of gripping members and their supporting bar and pneumatic operating means;

FIGURE 21 is a view looking from the left of FIGURE 20;

FIGURE 22 is a sectional plan on the line 22—22 of FIGURE 21;

FIGURE 26 is an end on view of a part of the bottom layer of bricks showing how the rows are grouped;

FIGURE 27 is a plan view partly in section of a spacing frame for the rows of bricks;

FIGURE 27B is a view of the frame parts after the grouping operation;

FIGURE 28 is a side elevation of the spacing frame;

FIGURE 29 shows the pneumatic circuit associated with the marshalling feed conveyor, the marshalling conveyor and its indexing mechanism, and gripper unit together with certain of the electric line switches;

FIGURE 35 is a front view of the lower and upper stacks which after being formed in the apparatus are superimposed and accommodated in the kiln chamber at one side thereof;

FIGURE 36 is a side view of these superimposed stacks;

FIGURE 37 is a front view of the lower stack after formation in the apparatus;

FIGURE 38 is a side view of the lower stack;

FIGURE 39 is a front view of the upper stack after formation in the apparatus; and FIGURE 40 is a side of the upper stack.

Figure 23:
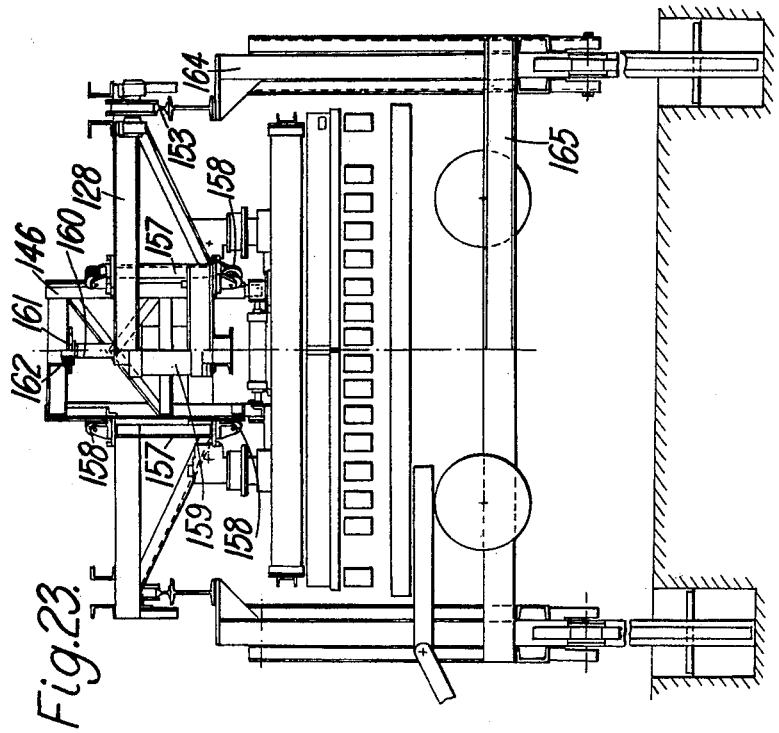
FIGURE 23 is an elevation of the transfer carriage and the lift mechanism looking in a direction along the direction of movement of the marshalling conveyor.

Referring to FIGURES 1 and 2, three brick presses are arranged side by side each of which deposits bricks, in pairs frog uppermost and spaced apart end to end lengthwise, onto and across a downwardly inclined gravity feed roller conveyor 10, the three conveyors being arranged parallel to one another. The three conveyors feed pairs of bricks successively under the control of sequencing mechanism 11 so that they fall edge on upon the first endless band conveyor 12 the bricks being disposed lengthwise end to end along the belt. The sequencing mechanism (see FIGURES 4 to 7) comprises a framework 13 disposed above the roller conveyor 10 on the upper side of which framework is mounted a rock shaft 14 extending across the width of the roller conveyor. Fixed to the rock shaft are two rocker arms 15 which are spaced apart correspondingly to the spacing of bricks in each pair and each of which rocker arms extend on both sides of the shaft 14 and has pivotally connected to its ends downwardly extending rods 16, 17. The rods pass through guides 18 in the frame so that they are spaced apart approximately 1½ times the width of a brick. The lower end of the leading rod 16, with respect to the travel of the brick, has a locating member 19 secured to it which may be brought by movement of the rock shaft in front of a leading brick while the lower end of the trailing rod 17 also has a locating member 20 which at this time is disposed above the following brick. The bricks in these positions are arranged to close two double pole switches LS29 and LS30 (see FIGURE 32) which are arranged in circuits with a timer switch TC1 and holding switch HC1 until the contacts of all the switches are closed the valve V19 actuated by solenoid 28 is not opened to energise a motor 24 the function of which is referred to later. When the rock shaft 15 is next moved, the first said locating member 19 is raised away from the leading brick and the other locating member 20 is lowered into the frog of the following brick, thus, the leading brick is capable of moving and the following brick is held against movement. The rocking movement is imparted to the rocking levers by a pneumatic motor 21 having its cylinder (which for convenience of the subsequent description is referred to as CYL8) vertically disposed above said frame 13 and having its piston rod 22 pivotally connected to a lever 23 on the rock shaft 15. The aforesaid motor 24 is mounted below the framework with cylinder (referred to as CYL19) horizontally disposed and having its piston rod 25 pivotally connected to a cross bar 26. The cross bar has pivoted to it two pawls 27 spaced apart and capable of entering the frogs of the two bricks beneath it. The two pneumatic motors 21, 24 (see FIGURE 7) are controlled by said valve V19 and a sequencing valve 29 (see FIGURE 32 and FIGURE 7) so that after the leading brick has been released by the elevation of the locating member 19 and the other locating member 20 has engaged the frog of a succeeding brick, the pneumatic motor 24 is energised whereby the pawls 27 engage leading faces of the frogs pushing each leading brick along the inclined roller conveyor 10 (which for convenience is shown horizontal in FIGURE 4) whereupon it falls off the end of the conveyor on to the first endless band conveyor 12. The operation of the switches LS29 and LS30 (see FIGURE 7) by the bricks upon leaving the mechanism has the effect of energising the solenoid 28 and moving the valve V19 against the action of a spring 43 (shown diagrammatically in FIGURE 7) whereby the locating member 19 for each leading brick is lowered and locating member 20 is raised and what have now become the leading bricks are moved by the weight of the bricks behind them on to the roller conveyor 10 past the pawls 27 which swing upwardly and the bricks are then arrested by the leading locating members 19 and the sequence of operations recommences.

The lower stretch of the endless band of the first endless band conveyor 12 is provided with a conventional tensioning device 31 (FIGURE 2) and is driven by a variable speed motor 32 at the discharge end. The first endless band conveyor discharges the bricks on to the upper end of a second inclined gravity feed roller conveyor 33 the lower end being pivotally mounted at 34 on a fixed part of the structure and the upper end of which is spring mounted at 35. Up and down movement of the upper end of the second roller conveyor 33 consequent upon varying number of bricks on that conveyor is arranged to actuate speed control mechanism for the motor 32 whereby the rate of feed of the first endless band conveyor is appropriately adjusted. One of the shafts of the conveyor has fixed to it cam mechanism 215 (FIGURE 2) which controls the rate of operation of the brick sequencing mechanism in accordance with the speed of the conveyor 12 as explained later in column 17, lines 36 to 48, for which purpose the cam is arranged to close the aforesaid timer switch TC1 each time the conveyor belt 12 has traversed a predetermined distance. Fixed guide rails 37 extend on either side of the gravity feed roller conveyor 33.

The brick feeding mechanism described above transfers the bricks to a marshalling apparatus.

The bricks pass off the end of the second gravity feed roller conveyor 33 on to a second endless band conveyor 38 hereafter referred to as the marshalling feed conveyor and which feed the bricks to a marshalling apparatus.

The band of the marshalling feed conveyor (see FIGURES 1, 3, 8 and 9) encircles two pulleys 39, 40 the first pulley 39 nearest the gravity feed roller conveyor being fixed to a shaft which rotates co-axially with the pivotal mounting 34 and the other pulley 40 being fixed to a spindle 41 (FIGURE 8) which is supported by bearings 42 and which extends beyond one of them and has slidably keyed to the projecting end, one part 43 of a cone clutch. The other part 44 of the cone clutch is fixed to a shaft 45 carried by bearings 46 and has also fixed thereto a driving pulley 47. The driving pulley is encircled by a belt 48 which encircles another pulley 49 (FIGURE 3) on a shaft 50 driven through gearing 51 from a motor 52 so that the speed of drive to the marshalling feed conveyor belt is about sixty feet per minute. The moving element 43 of the cone clutch is actuated by a pneumatic motor 53 (referred to in FIGURE 29 as CYL2) the piston rod 54 of which is pivotally connected to one end of a rocking lever 55 the other end of which is forked and is provided with pins 56 engaging a circumferential groove 57 in a hub portion 58 of the clutch element. The bricks pass off the pulley 40 and the band 38, between two guides 59, 60, first onto two supporting rollers 61 (FIGURE 9) arranged with their axes transverse to the length of the bricks and then onto a marshalling conveyor described later.

One of the aforesaid guides 60 has association therewith a pneumatic motor 62 (referred to as cylinder 1 in FIGURE 29) the piston rod 63 of which has fixed thereto a clamping plate 64 which may clamp a brick against a guide 59 and thus arrest the oncoming line of bricks bing fed by the marshalling feed conveyor. The clamping plate is provided with guide pins 65 which engage guide holes in the guide 60.

Cylinders 1 and 2 are controlled by electromagnetically operated valves V5, V6 (see FIGURE 29) which are reset by an indexing mechanism described later. Also associated with the cylinder 2 is a sequence valve 66.

The marshalling conveyor (see FIGURES 10–13) and which is located at the upper part of the right hand end of FIGURE 1 comprises a number of pairs of guide rails 67 which are fixed to alternate links 68 of each of a number of chains which links are connected to other links 69 by pins 70 encircled by rollers 71 (FIGURE 12). It will be noted certain of the guide rails are wider than the others and one of the links 72 is provided with a single guide rail 73 to enable a standard pitch chain to be employed and yet provide the required spacing of the rows. The chains each encircle two sprocket wheels 74, 75 (FIGURE 10) fixed to shafts 76, 77 carried by bearings 78, 79 fixed to the frame 80 of the apparatus and the upper stretch of each chain in passing from one sprocket wheel to the other is supported by its rollers 71 coming into engagement with a guide 81 (FIGURE 12) fixed to said frame.

The shaft 77 is driven step-by-step by indexing mechanism described later.

Each guide rail 67 has fixed to its inner edge a number of brackets 87 (FIGURE 13) on which are mounted rollers 88 engaging tracks 89 on the frame of the machine.

Figure 16:
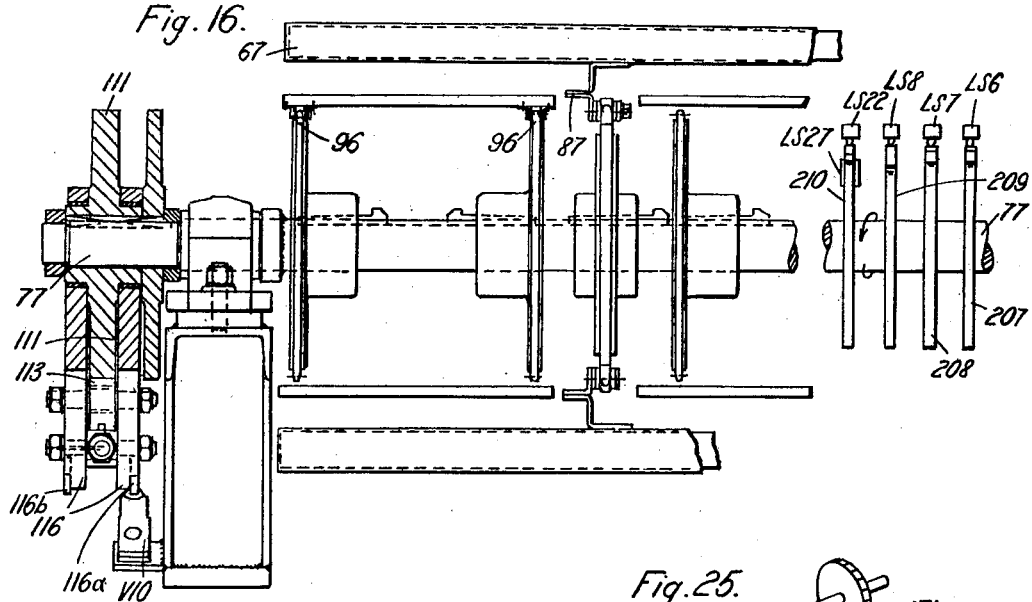
FIGURE 16 is a section on the line 16—16 of FIGURE 15.

As the chains pass off the sprockets 74, a pair of the guide rails 67 move above and opposite a series of rollers 82 (FIGURES 12 and 13) arranged with their axes transverse to the axes of the shafts 76, 77 and parallel to the axes of the rollers 61 which series of rollers extend across the marshalling feed conveyor. As will be seen from FIGURE 12 the rollers 82 are mounted on spindles 83 carried by angle irons 84 fixed to a frame member 85 of the machine. When a pair of guide rails 67 is brought by the step-by-step movement of the marshalling conveyor into line with the rollers 61 and 82 a predetermined number of bricks according to the operation of certain stops described later is fed between the guide rails and roll along the rollers and when the marshalling conveyor moves the next step the line of bricks is carried on to groups of slats forming part of a secondary endless conveyor carrying slats 90 (see FIGURES 10 and 16). The secondary conveyor is driven step-by-step by the shaft 77. Each group of the slats is made up of three slats 90, 91, 92 (FIGURE 11) arranged in line and the slats in one group are linked to the slats in an adjacent group by pivoted links 93, the slats being provided with lugs 94 which engage the pivot pins of the links. The pivotal connections of the links embody rollers 95 which engage teeth of sprocket wheels 96, 97 secured to the shaft 77 and 98 respectively.

Assuming the marshalling conveyor is stationary and the clamping plate 60 of the marshalling feed conveyor is disengaged, a row of bricks will be fed on to the marshalling conveyor between two of the guide rails 67 by the conveyor 28 which is automatically declutched by the clutch 43, 44 (FIGURE 8) when a leading brick engages one of a number of stops as described later. The clamping plate 60 is then operated to arrest the feeding of the bricks, the indexing mechanism then operates to move the marshalling conveyor one step so that the next pair of guide rails 67 are opposite the marshalling feed conveyor whereupon the clamping plate 60 is released and another row of bricks is fed onto the marshalling conveyor and so on. The length of the supported part of the upper stretches of the chains and the upper stretch of the slatted conveyor are sufficient to accommodate nine rows or lines of bricks and the number of bricks in each row may be up to eight. The number of bricks in a row or line is controlled by a series of stops movably mounted on a fixed part of the structure 99 (see FIGURE 14) so that they may be selectively projected into the path of the movement of the bricks between the guide rails 67 when stationary opposite the marshalling conveyor. Four of such stops are provided two of which are illustrated in full and two partly illustrated in FIGURE 14. The four stops are operated by small pneumatic motors 100 controlled respectively by solenoid operated valves V1, V2, V3, V4 (see FIGURE 29). Each of the stops comprises a bell crank lever 101 (FIGURE 14), pivotally mounted at 103 on a head 104 fixed to the piston rod 105 of the motor. The lever arm is urged to one limiting position on the head by a spring 105 and when in this position one arm 101 of the lever is spaced away from a stop 107. When a motor is energised to bring the lever arm 101 into the path of the bricks, an abutment 108 on the other lever arm 102 will operate one of the micro switches LS1, LS2, LS3, LS4 (also shown in FIGURES 29 and 34), when bricks have struck arm 101 causing it to make contact with the stop 107. Another bell crank lever 109, 110 is arranged at the end of the guide rails having its arm 109 permanently in the line of the travel of the bricks and its other arm operating another micro switch LS5. The various micro switches serve to initiate the movement of the indexing mechanism about to be described whereby the marshalling conveyor is moved one step to bring another pair of the guide rails opposite the marshalling feed conveyor to receive another row of bricks.

Figure 15:
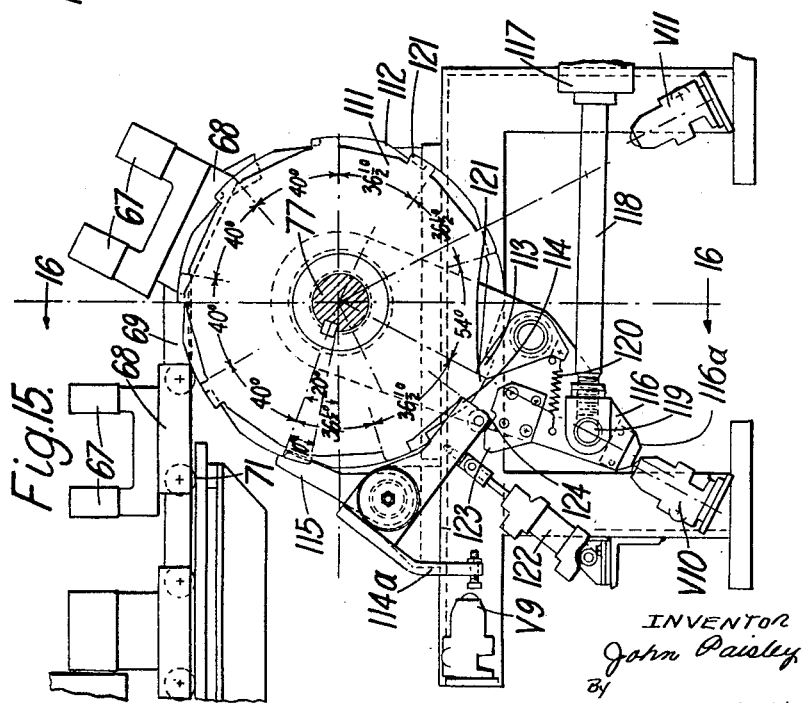
FIGURE 15 is an end elevation of the indexing mechanism controlling the movement of the marshalling conveyor.

The indexing mechanism (see FIGURES 15 and 16) for controlling the step-by-step movement of the marshalling conveyor comprises toothed wheels 111 and 112 both fixed to the shaft 77. The former wheel 111 has associated therewith two pawls 113, 114 and the latter toothed wheel 112 has associated therewith a single pawl 115 which is pivoted co-axially with pawl 114 and is movable independently thereof and is spring pressed towards the toothed wheel 112. The pawl 113 is pivoted between two arms 116 which swing about the shaft 77 and is operated by a pneumatic motor 117 indicated in the circuit diagram (FIGURE 29) by CYL4, the piston rod 118 of which is pivotally connected to the arm at 119. The pawl 113 has associated with it a spring 120 which enables the pawl to snap past a tooth on the wheel 111 upon return movement of the arms 116.

The length of the stroke of the motor 117 is such that after the pawl 113 has engaged one of the teeth 121 and moved it the required distance clockwise the pawl 113 can then return and snap over to the rear of the next tooth 121 and during this movement the shaft 77 is prevented from being rotated in the reverse direction by the pawl 115 being spring pressed into engagement with the ratchet wheel 112. The extent of step-by-step clockwise movement of the toothed wheel 111 is accurately controlled by the second pawl 114 which shortly before the end of the stroke of the piston rod 118 is brought into the path of travel of the tooth 121 by another pneumatic motor 122 (indicated in FIGURE 29 by cylinder 3) assisted by a nose piece 123 on the arms 116. The nose engages a roller 124 on a part of the pawl 114 which pawl 114 is subsequently withdrawn by motor 122 (FIGURE 29) when the first pawl 113 has withdrawn to engage another tooth and is about to move it. The cylinder 3 in withdrawing the pawl 114 actuates a valve V9 described later. One of the arms 116 carrying the first pawl 113 is provided with an extension 116a which at opposite limits of its travel engages control valves V10 and V11 whereas the other arm 116 is provided with an extension 116b (FIGURE 16) which controls valves V5 and V7 (shown in FIGURE 29), the functions of which four valves are described later.

The withdrawal of the pawl 114 is arranged to operate the valve V9 through an arm 114a fixed to the pawl. The toothed wheel 111 is provided with nine teeth 121 one tooth for each row of bricks.

The flow of air to and from opposite ends of the cylinder 4 is controlled by pneumatically operated changeover valves V12, V13 (FIGURE 29) which are themselves controlled respectively by valves V11 and V9 and a sequence valve controlled by the valve V10 while the cylinder 3 is controlled by a pneumatically operated changeover valve V8 which in its turn is controlled by the valve V7. The functioning of which valves is described later.

The marshalling conveyor is arranged beneath a pair of gripper frames 126 (see FIGURES 3, 17, 18, 19) arranged side by side across the width of the marshalling conveyor and carrying a number of pairs of grippers 127 arranged in rows spaced apart in corresponding manner to the spacing apart of the pairs of guide rails 67 on the marshalling conveyor and there being nine rows of grippers on each frame with four pairs of grippers in each row.

The gripper frames 126 are so mounted on a transfer trolley 128 (FIGURE 3) that they may be raised, lowered and rotated in relation to the carriage and to the marshalling conveyor.

At the commencement of a cycle when the marshalling conveyor is empty of bricks the gripper frames 126 are in an elevated position. The clamping plate 60 associated with marshalling feed conveyor is released, a row of bricks is fed between two of the guide rails 67 on the marshalling conveyor. The clamping plate 60 again comes into operation; the indexing mechanism then operates to move the marshalling conveyor one step; the clamping plate 60 is again released, and feeds a row of bricks between the next pair of guide rails 67. The clamping plate 60 is again operated, the marshalling conveyor is moved a further step and so on until nine rows of bricks have been accumulated on the marshalling conveyor. At this stage the gripper frame descends so that the pairs of grippers 127 straddle the bricks, the grippers then close on the bricks and the frame is again raised. Each of the gripper frames 126 is fixed to a spindle 129 (FIGURE 17) mounted to rotate about a vertical axis in a bearing 130 fixed to a part 131 supported by a carriage 132. The wheels 132a of the two carriages engage channel-shaped rails 133 on a superstructure 146 (FIGURE 23) which in its turn is so mounted on the transfer trolley 128 (FIGURE 23) as to be movable in an up and down direction (as hereinafter described) and which trolley is movable horizontally in the same direction as the step-by-step movement of the marshalling conveyor.

As indicated above each gripper frame 126 has nine rows of pairs of gripper members 127 with four pairs in each row. The two carriages 132 are moved towards and away fom one another in a direction across the width of the marshalling conveyor by two pneumatic motors 134, 135 (FIGURE 18), the cylinders of which are indicated by CYL7A and CYL7B in FIGURE 29. The motors are mounted side by side on a cross member 136 which latter is fixed to the rails 133. The plungers 137, 138 of the motors project from opposite ends of the motor assemblage and bear on adjustable abutments 139, 140 on the two carriages 132 respectively. The two carriages are connected by pivoted links 141, 142 to opposite ends of a lever arm 143 pivoted intermediate of its ends by a pin 144 to the cross member 136 whereby the movements of the carriages are equalised. Rotary movement is imparted to the spindle 129 of each gripper frame 126 by a suitable pneumatic motor 145 having cylinders 6A and 6B as indicated in FIGURE 29. Thus when it is desired to orient the bricks elevated by the gripper frames so that the rows of bricks extend in a direction at right angles to those previously raised the two carriages 132 are moved apart by the two pneumatic motors 134, 135, the two spindles 129 rotated through ninety degrees and the two gripper frames 126 moved together again.

Figure 24:
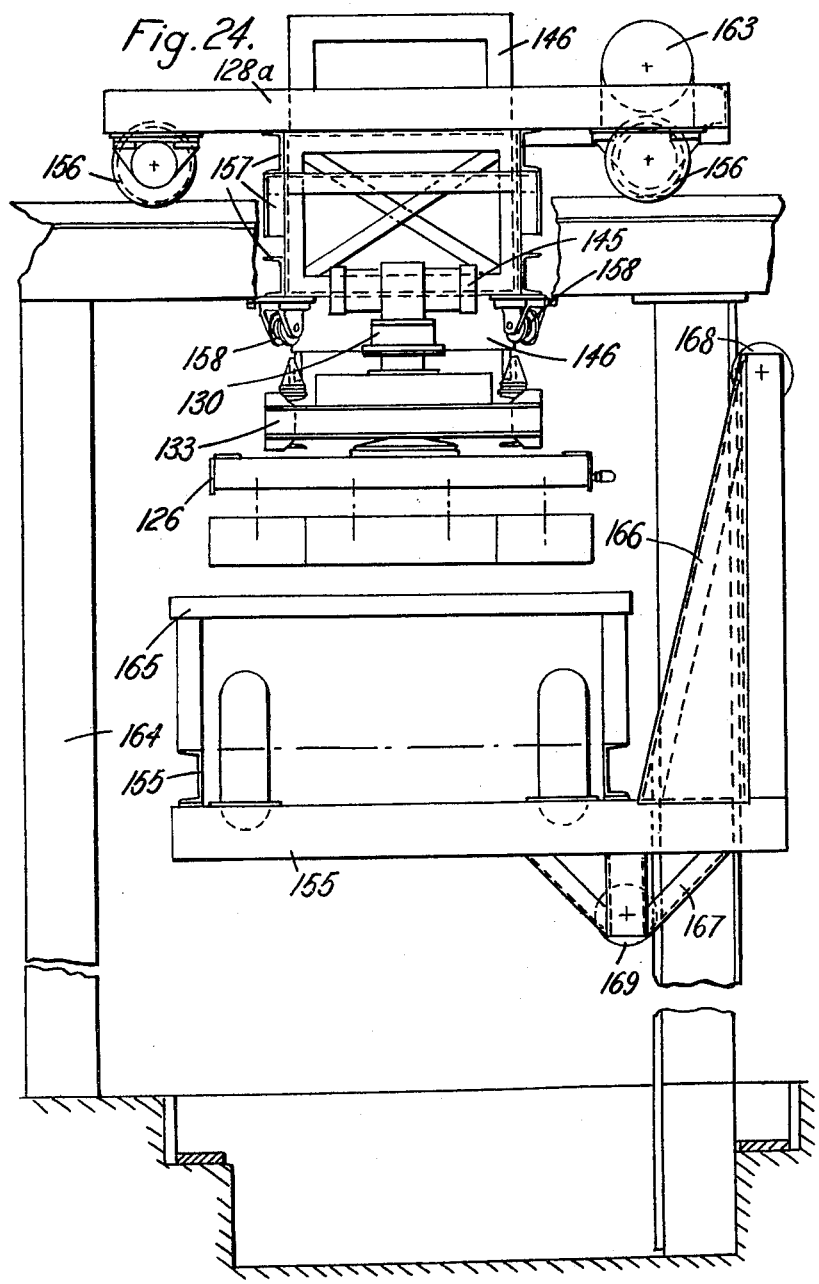
FIGURE 24 is a view looking from the left of FIGURE 23.

Extending between opposite frame members of each rectangular gripper frame are nine expansible resilient bolsters 147 (FIGURE 19) one over each row of bricks and extending between the other opposite frame members are four cross bars 148 extending over each of the four bricks in each row. Each cross bar 148 extends through apertures 149 (FIGURE 20) in each of two gripping members 127 associated with each brick. The aperture in each gripping member is flanked by two lugs 150 and the two lugs of one gripping member overlap those of the other gripping member and these lugs are provided with registering holes through which extend a pivot pin 151 fixed to the cross bar 148. The limbs on the gripping members on one side of each pivot pin are arranged to grip the brick while the other ends straddle one of said bolsters 147. Springs 152 are connected between the cross bar 148 and gripping limbs so as to tend to draw them apart. The gripping members are closed and opened in the required time relationship, the first action under the control of a double pole limit switch 13 (FIGURE 30) controlling valves V16A and V16B (FIGURE 29) allowing pressure to be built up in the bolsters 4 when the pressure builds up it actuates a pressure responsive switch PSW1 (FIGURE 29) which in its turn electrically controls a valve V17 associated with the motor 59 for lifting the gripper frames. The opening of the grippers is effected by release of pressure on them when the gripper frame descends and when pressure in a cylinder 159 (FIGURE 23) diminishes and operates a pressure responsive switch PSW2 which opens the bolsters to exhaust. The transfer trolley 128 shown in FIGURE 23 is arranged to run on rails 153 which extend from a position above the marshalling conveyor to a location above the top of a lift structure 164 (FIGURE 24) where the bricks are unloaded on to a platform 165 which is lowered step-by-step by the lift.

The transfer trolley comprises a rectangular frame 128a on wheels 156 engaging said rails 153. Depending from the frame are two structures 157 each having four guide rollers 158 at the top and four guide rollers 158 at the bottom and which engage four upright members of the structure 146 from which the superstructure of one of the gripping frames is suspended. Each depending structure 157 (FIGURE 23) also has attached to it the vertically disposed cylinder 159 (indicated by CYL5 in FIGURE 29) of a pneumatic motor, the plunger 160 of which engages an abutment 161 on a cross bracing 162 at the upper ends of the aforesaid upright members of the structure 146 whereby the gripping frames 126 may be raised or lowered. One end of the rectangular frames 128a of the transfer carriage supports an electric motor 163 (FIGURE 24) which dives through gearing a shaft on which two of the wheels 156 of the trolley are fixed.

The rails 153 at one end are supported by four uprights 164 of the lift structure, up two of which is guided the platform 155 which carries the support 165 (which may be in the form of a trolley) onto which the bricks are deposited by release of the gripping members.

The platform 155 (FIGURE 24) is provided on each side thereof with upward and downward extensions 167 having wheels 168 which engage in the outer and inner sides of two of the uprights 164.

Figure 25A:
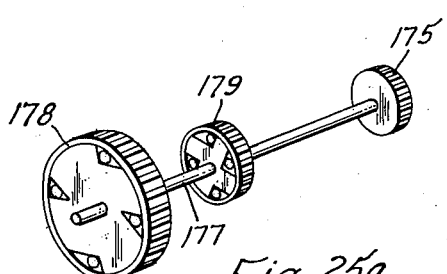
FIGURE 25A is a perspective view showing the clutches 254 of FIGURE 25.
Figure 25:
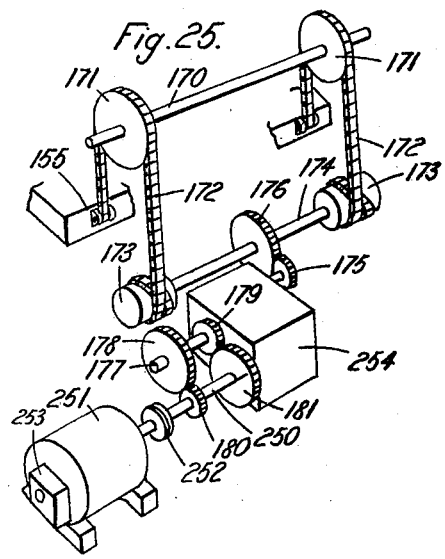
FIGURE 25 is a diagrammatic perspective view of the drive for the lift.

Each of said two uprights 164 also supports a shaft 170 (shown diagrammatically in FIGURE 25) carrying two sprockets 171 around each of which extends a chain 172 one end of each of which chains is attached to the platform 155 and the other ends of which chains are anchored to two wheels 173 on a shaft 174. The shaft 174 is driven by the output shaft of a reduction gear box through gear wheels 175, 176. The input shaft 177 of the gear box 254 has two different sized gear wheels 178, 179 connected to it by uni-directional clutches of opposite sense i.e. when the shaft is rotaing in one direction it will rotate one of the gear wheels while the other free wheels, while when the shaft rotates in the opposite direction the other gear wheel is driven and the first said gear wheel free wheels. A roller type clutch mechanism for this purpose is shown in FIGURE 25A. The two gear wheels 178, 179 engage respectively two other gear wheels 180, 181 fixed to a shaft 250 connected to a reversible electric motor 251 by a coupling 252. The gear ratios of the wheels 178, 179, 180, 181 are so selected that when the motor is rotating in a direction to lower the platform 155 the input shaft is being driven through the gears 180 and 178 and is rotated at a slower speed than when the motor is reversed to effect a drive through the gear wheels 181, 179. The output shaft of the gear box also drives a cam 253 (see FIGURE 3) which operates the line switch LS28a, b (see also FIGURE 34). Relays RG and RH control the switch mechanism for the forward reverse circuits of the motor as described in column 16, lines 11 to 29.

Figure 30:
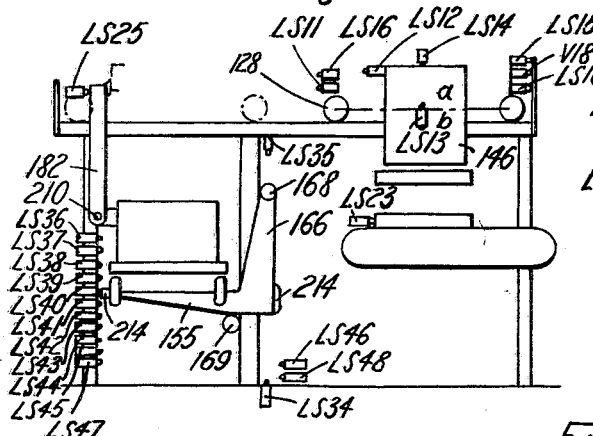
FIGURE 30 is a diagrammatic side elevation of the marshalling conveyor, transfer carriage and lift showing the positions of certain of the pneumatic contact valves.
Figure 31:
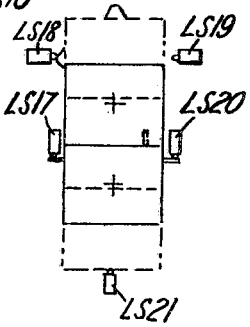
FIGURE 31 is a diagrammatic plan view of the gripper frames showing the position of certain of the pneumatic control valve and electric line switches.

As will be seen from FIGURE 30 a number of line switches LS36 to LS47 are arranged one above the other and are arranged to be engaged by a cam on the platform as it reaches each level and these switches control the valves which in their turn control the operation of the stops 101 associated with the marshalling feed conveyor.

The grouping of the bricks in the two bottom layers requires to be different from those in the next layer (see FIGURES 26 and 35 to 40). In each of the two bottom layers views from the side, as in FIGURES 2 and 8 where the bricks appear as headers there requires to be a row of four single bricks end-to-end on the outside and the other rows require to be arranged so that there are two rows in contact side-by-side as viewed from the front as headers then a gap and then two more rows side-by-side. Thus there will be three double rows as viewed being headers, a single outside row at each end instead of eight single spaced rows as originally delivered on to the platform.

To accomplish this there is provided a grouping frame shown in FIGURES 27, 28 which is mounted to the frame to swing about a horizontal axis 210 (see FIGURE 30) between horizontal and vertical positions. The grouping frame is provided with two opposite side frame members 182 which are of such a length as to lie across fourteen of the rows of bricks which have been deposited on the platform. End members 183 lie between each outer row and the next row. The frame can be considered to be in two halves and each side member 182 is provided on each side of a centre line and is provided with three slots 184, 185, 186 of increasing length those nearer an end frame member 183 being greater. Slidably mounted in each slot is a block 187 and extending from each block on the side of the frame to a corresponding block on the other side of the frame are grouping bars 188 which bars extend through the spaces between every other row of bricks. Each block is provided with a pin 189 projecting from its outer face. Slidably mounted on the outside of each half of each side member is a control bar 190 having a hole in its outer extremity which engages the pin on the block which is in the longest slot 186 while the other pins extend through slots 191, 192 in the control bar 190, the slot at the inner end of each bar being larger than the adjacent slot. Each of the two bars 190 on each side of the frame has pivoted to the outer face thereof, by a pivot 193, one end of a bent link 194 the other end of which is pivoted by a pin 195 to a face of a pinion 196 pivotal connections of the two links being diametrically arranged.

Figure 33:
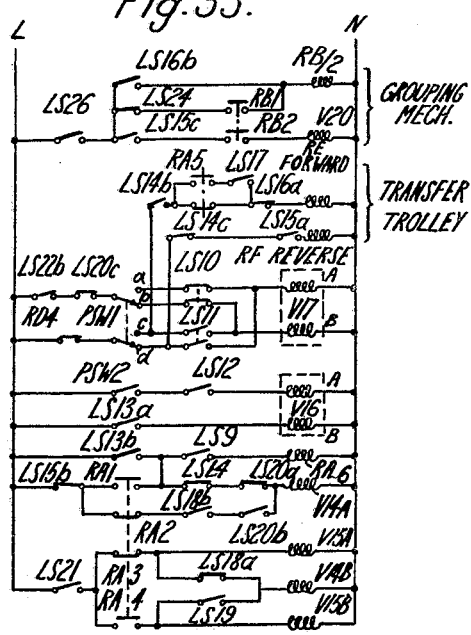
FIGURE 33 shows the electric circuit associated with the grouping mechanism and transfer carriage.

The pinion 196 on each side of the frame is engaged by an arcuate rack 197 the racks being fixed to a cross shaft 198 having a lever arm 199 at its centre to which is pivotally connected at 200 the piston rod 201 of a pneumatic motor, the cylinder 202 of which is disposed substantially horizontally and is pivoted at 203 to a fixed part 204 of the frame. By suitably selecting the lengths of the aforesaid slots reciprocation of the piston rod will group the rows of bricks in the required manner. The grouping frame is raised and lowered by a motor 206 (see FIGURE 3) the control valve V20 FIGURE 33 of which being operated electromagnetically by a circuit including the switches LS26, LS16, LS24, LS15 and RB1 and RB2 (FIGURE 33). The motor 202 is controlled by a valve (not shown) which is operated by the last part of the downward swing of the grouping frame.

In order to build up successive layers of bricks the marshalling feed conveyor feeds the bricks end to end lengthwise on to the marshalling conveyor which is traversed step-by-step until eight spaced rows each of up to eight bricks are formed according to the setting of the stops 101, the two gripping frames then descend and the grippers grip the rows of bricks and the frames are raised rotated through 90° and are moved by the transfer trolley over the lift whereupon the gripping frames descend, the grippers release the bricks on to the support or on to a truck on the lift and after the first two layers have been deposited the grouping frame comes into operation. In the meantime the next eight rows of bricks are being assembled on the marshalling conveyor and the transfer trolley returns the gripping frame back again over them. The frames are again lowered, the grippers grip the rows of bricks and the frames are elevated without rotation whereupon the transfer trolley moves them over the lift where they are lowered and grippers opened to deposit the bricks, so that they extend across the bricks of the first layer. The platform descends and the transfer trolley again returns and picks up the next layer without the frames being rotated and so on.

If a square stack of bricks is to be formed the same number of bricks are fed by the marshalling feed conveyor to each cycle but where the roof is arch shaped, which is usually the case the number of bricks on the upper layers require to be diminished.

Referring to FIGURES 35 to 40, in the case of a kiln chamber having an arched roof it is convenient to build up each half of the kiln on one side of a vertical central plane extending along the length of the kiln to the full height in two stages so that the marshalling conveyor is arranged to feed, to the lift, two successive stacks each of about one half the height of the kiln and half the width as shown in FIGURES 35 and 36. In the present instance the lower stack has eleven layers and the upper one has twelve layers and each stack is half the width and height of the kiln. In the two superimposed stacks containing the twenty three layers there are two forms of layer to be marshalled. In the following description a reference to a row of bricks means a number of bricks arranged end to end and which when viewed from an end appear as headers and when viewed from a side appear as stretchers.

The two forms of layer are as follows:

(a) Those in which when first marshalled comprises nine rows of equal numbers of bricks, e.g. eight end to end, but which when engaged by the gripping heads and rotated may produce eighteen rows of four bricks end to end.

(b) Those in which when first marshalled there are rows containing a various number of bricks arranged end to end.

The marshalled layers which fall into the category (a) are 3, 4, 5, 6, 7, 8, 9, 10, 11, 14 and 15 and which when gripped by the gripping head and in some cases rotated produce the following numbers of rows layers 3 and 4 have nine rows of eight bricks; layers 5 and 6 have eighteen rows of four bricks; layers 7 and 8 have nine rows of eight bricks, layers 9 and 10 have eighteen rows of four bricks; layers 11, 14 and 15 have nine rows of eight bricks; layers 18 and 19 have nine rows of seven bricks; layers 22 and 23 each have nine rows of five bricks.

The layers falling into category (b) are numbers 1, 2, 12 and 13, each when initially marshalled have eight rows of eight bricks and one empty row and which after being gripped by the gripping heads and rotated produce sixteen rows of four bricks in each of the layers.

Also in the same category (b) are layers 16 and 17 each with eight rows of eight bricks and one row of four bricks, and after being gripped and rotated by the gripping head produce seventeen rows of four bricks.

Layers 20 and 21 each provide for five rows of eight bricks which when rotated form ten rows of four bricks and which together with four rows of four bricks makes a total of fourteen rows of four bricks.

The layers falling into category (a) are marshalled by arranging the movement of the lift to actuate directly switches in circuit with the means which actuate the required stops and maintaining this contact until the layer is completed.

Those in category (b) are marshalled by switching via one of the intermediary switches LS6, LS7 or LS8 these being controlled by one of a number of cam plates 207, 208, 209 moving round under the action of the indexing mechanism shaft 77.

As there are only three layer forms in category (b) it will be seen that complete control of the brick pattern in any layer can be achieved by providing a switch for each layer controlled by the movement of the lift viz. switches LS36 to 48 plus the three switches LS6, LS7 and LS8, each operated by one of the aforesaid cam plates 207, 208, 209 attached to the indexing mechanism.

The layer selection for two successive stacks is controlled by thirteen switches (FIGURE 34) of which 36 to 45 are double pole switches the two poles of each of which are layer selecting circuits. The other switch 46 being a double pole switch of which one pole deals with layer selection in one of said two circuits and the other pole is in the lift control circuit. The other switches 47, 48 are single pole switches so connected in circuit to select the bottom layers of the two stacks. These switches are all operated by the trolley lift (see FIGURE 30) thus ensuring the correct build up of any half stack.

The number of bricks in a line, if less than eight, is controlled by energising one of the four solenoid controlled valves (V1, V2, V3 and V4) controlling the stop motors. This causes the particular stop 101 to project into the path of bricks entering the marshalling conveyor, and when struck, causes V5 to become energised.

The energisation of the valve V5 causes cylinder 1 to clamp on the first brick outside the marshalling area and cylinder 2 to disconnect the marshalling feed conveyor clutch. The pressure build-up after completing the above produces a pressurised pilot line through to V8 which controls the motor 122 for the locating pawl 114 (V6 is de-energised i.e. open and V7 is held open by main indexing arm 116), thus there is a delay before the indexing mechanism operates.

The opening of V8 causes cylinder 3 to pull the location pawl 114 clear of indexing wheel 111; in donig so V9 is depressed thus reversing V13.

The reversal of V13 changes over the supply lines to cylinders 3 and 4, which operate respectively the locating pawl 114 and the indexing wheel engaging arm, the latter cylinder 4 receiving a high pressure supply to move the marshalling conveyor along one step. V7 is released when the conveyor has been moved to short distance.

The release of V7 connects the pilot line to V8 to exhaust. V8 thus reverses under spring pressure.

When V8 is reversed the pawl 114 is moved forward by the cylinder 3 under low pressure this is assisted in its final location by a nose piece 123 on the indexing arm 116. During the last part of the indexing motion V5 which controls marshalling feed conveyor is reset and V10 is depressed by the indexing arm 116 (note V5 was de-energised by any of the stop switches LS1 to LS5 being released as the bricks holding it in contact were moved out of the line of the marshalling feed conveyor by the step by step movement of the marshalling conveyor).

The resetting of V5 causes clamping plate 64 to open and the marshalling feed conveyor to become operative thus allowing bricks to enter marshalling area.

The depression of V10 causes V13 controlling the motor for the pawl 114 to reset thus supplying cylinder 3 with high pressure supply and cylinder 4 with low pressure supply, when this is completed pressure passes through the sequence valve to reverse V12.

The reversal of V12 causes the "indexing arm 116" to move away from the location pawl 114, this will continue to do so until V11 is depressed. This will reset V12, thus sending the indexing arm 116 forward once again, but still under low pressure. The indexing arm will finally come to rest when the pawl 113 makes contact with the next tooth position 121 on the indexing wheel, having completed a cycle.

In indexing, the plate cams will have pre-selected the next stop through one of the switches LS6, 7 or 8 or 22 (see FIGURES 16 and 34) in conjunction with one of the switches LS36 to 38 controlled by the lift if a change in the number of bricks is necessary.

When the layer is completed the lift position will re-select the next layer as hereinafter described.

A switch LS22 will be operated by a cam on the indexing mechanism when the first row of a fresh layer is being filled. A second switch LS23 (see FIGURE 30) will be made by coming into contact with a completed layer of bricks.

The closing of the contacts LS22 (see FIGURE 34) and of the contacts of the switch LS23 will energise the lock out valve V6 thus preventing any further indexing since the pawl 114 cannot be withdrawn by its motor which is now connected to exhaust until the completed layer has been lifted clear.

The closing of the switch contacts LS22 by the cam disc 210 completes the circuit through to V17a (see FIGURE 33) which causes the gripper frames to be lowered by exhausting cylinder 5. Contact between LS14 and gripper lifting framework is broken which brings in an additional switch LS14d (see FIGURE 34), the function of which is described later.

When the gripper frames reach the extreme "down" position, the contacts LS13a and LS13b (see FIGURES 29 and 33) are closed. The contacts LS13a in closing energise V16b thus permitting air to pass into the bolsters 147 causing the grippers to close on the bricks via valve V16b. A pressure build-up in the air bolster circuit operates the pressure switch PSW1, thus changing the circuit to pass through contact points "a" and "c." This allows V17A to become energised causing gripper lifting motor 159 to raise the gripper frames.

Figure 34:
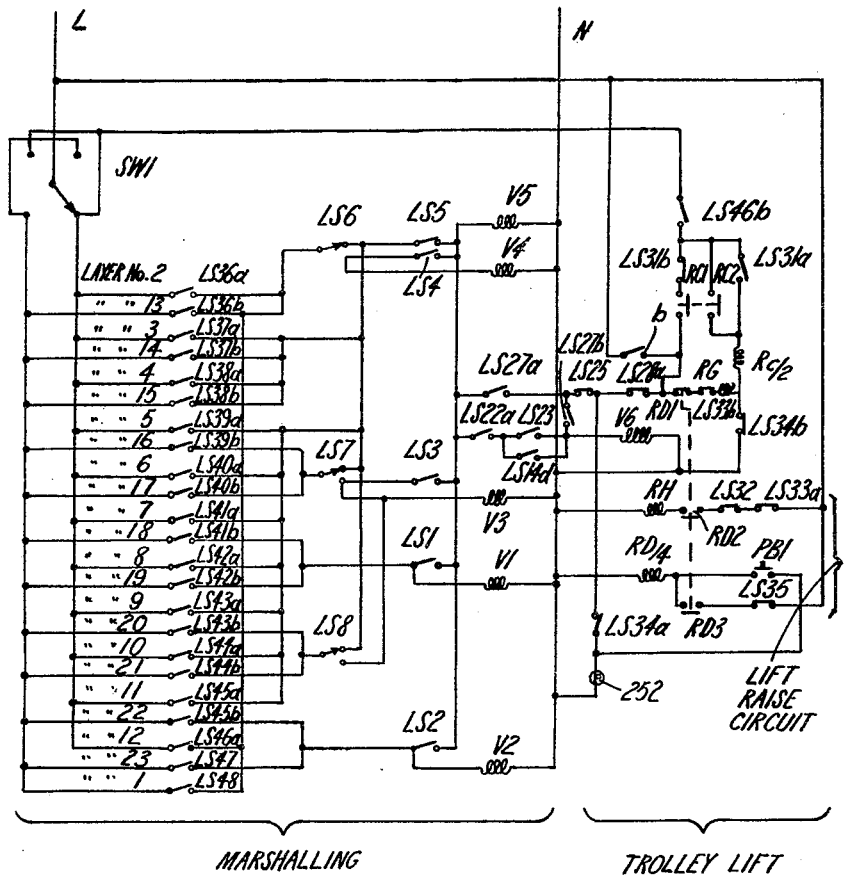
FIGURE 34 shows the electric circuit associated with the marshalling conveyors and lift.

The line switch LS23 will open as soon as the bricks start to leave the marshalling area but V6 (FIGURE 29) is maintained energised closed via LS14d (FIGURE 34).

This latter switch opens when the grippers are fully raised. This breaks the supply through to V6 thus allowing indexing of marshalling mechanism to continue.

Each layer of bricks has to be deposited on to the trolley in the lift in one of two ways i.e. as rows of "headers" or "stretchers." As "stretchers," the bricks are simply transferred to the trolley in the form in which they are received by the marshalling conveyor without further manipulation but to obtain a layer of "headers" the layer accumulated by the marshalling conveyor must be split half way along the length of a full layer. This is effected by rotating the two gripping frames through 90° after they have been raised.

The formation of a layer of headers is determined by LS9 being operated by each of a number of cams 255 FIGURE 3 when the trolley lift is in any of a number of predetermined positions.

Assuming a layer of headers is required:

The gripper assemblage when in its lower position will have closed switch LS13b (see FIGURE 33) which with switch LS9 will have energised the relay RA/6. This relay will be maintained under the action of LS15b and RA1 and switch LS13b opens on gripper frames rising.

The changeover valve V14a (see FIGURE 33) will be energised by LS14a (see FIGURE 33) when grippers have reached their uppermost position, this causes the motors 134, 135 to open out the two half frames LS20a opens and LS20b closes as soon as any movement has taken place which will eventually cause the frames to return to their initial position.

When the frames have reached the end of their travel LS21 is operated. This completes a circuit causing the V15b to be energised and the motor 145 to operate, thus causing the two half frames to rotate through 90°.

On completion of rotation LS19 (see FIGURE 33) is closed (LS18a having opened as soon as rotation commenced), thus energising V14b and causing the motors 134, 135 to bring the frames together.

In this position LS17 (see FIGURE 33) is closed, so that the motor-starting-relay for forward motion of the transfer trolley 128 (see FIGURE 3) is energised via PSW1 "c" (see FIGURE 33), LS14b RA5, LS17 and LS16a.

As soon as forward motion takes place, LS10 and LS15, are opened by their springs. This completely isolates V17 (LS10 open). The relay RA/6 is de-energised by LS15b opening and LS15a presets for reversing transfer trolley motor 163.

When transfer trolley reaches the trolley lift position LS11 and LS16 are operated (FIGURES 30–33): LS16a de-energises motor relay; LS16b makes one contact in the grouping mechanism circuit (FIGURE 33); LS11 completes circuit through PSW1 "c" to V17b energising the motor 159 causing gripper frames to lower. The gripper frames lower by exhausting via a relief valve 211 and bleeder 212. The relief valve setting is such as will support say 95% of the combined weight of the gripper frames 126 and lifting framework 162. The rate of its descent will be governed by a throttling valve 213 (FIGURE 29).

When the layer of bricks in the gripper frames makes contact with those already on the trolley, the weight transfer will cause the exhaust pressure from cylinder 5 of motor 159 to drop to a value determined by the setting of the relief valve 211 (FIGURE 29). This pressure drop will cause PSW2 (FIGURES 29 and 33) to operate thus energising V16a and opening the grippers via LS12 (LS12 will have operated after approximately 1" of down travel, and will have prevented V16a being operated before the weight transfer has taken place, due to any sudden variation of pressures at the start of the downward motion of the gripper frame, thus preventing premature opening of the grippers).

The energisation of V16a causes the "air bolster" to be exhausted thus releasing the bricks. The pressure drop due to exhausting, re-sets pressure switch PSW1 to contacts "b" and "d" this causes V17a to be brought to a position to energise the motor 159 to raise gripper frames. LS14 operates when gripper frames are in their uppermost position (see FIGURE 30) thus completing circuit through to the starting relay (RF) (FIGURE 33)

for transfer trolley motor 163 so that the motor starts up in reverse.

The switches LS11 and LS16 are released as soon as reverse motion of the transfer trolley has taken place whereupon; LS11 isolates V17; LS16a re-sets in transfer trolley motor forward circuit and LS16b is cut out of grouping mechanism circuit. The switches LS10 and LS15 are operated when the transfer trolley reaches marshalling area.

The switch LS10 closes establishing a circuit with motor 159 through to V17b when LS22b and LS20c have made thus lowering the gripper frame.

The switch LS15 which has been operated by the return of the transfer trolley de-energises the trolley-motor-relay bringing the trolley to rest.

The switch LS15b is also closed by the return of the trolley and completes a circuit via RA2, LS20b and LS18b through to V14a which energises the motors 135 and 136 in a direction to open out the two gripper frames. LS21 operates when gripper frames are fully separated thus energising V15a via RA3 energising the motor 145 so as to rotate the gripper frames through 90° returning the grippers into "stretcher form." The valve V14b energises when LS18 operates, returning frames into their closed position.

When the frames have closed in the stretcher form LS20 is operated and LS20a and b make and break respectively. LS20c makes in circuit to V17b, V17b becomes energised when LS22b makes thus establishing conditions ready for a completed layer to be gripped and transported.

For transferring a layer of stretchers a circuit (see FIGURE 33) PSW1 "c," LS14b, RA6 and LS16a are completed through to transfer trolley motor "forward" relay RE when a layer of bricks have been raised to their uppermost level. Likewise the transfer trolley motor will reverse after reaching trolley lift area, when a circuit is completed via RD4 PSW1d, LS14c and LS15a by reason of the release of the bricks.

The grouping mechanism only requires to come into operation when the first two layers of each stack are positioned on the trolley, therefore the need for the grouping mechanism will always be determined when the trolley lift is in the same position. Therefore, with the first layer of bricks on the trolley, the trolley lift will move down a layer thus operating LS26 (FIGURES 30 and 33). In this position, the transfer trolley will bring the second layer into the trolley area and deposit the second layer on top of the first. In doing so it will have operated LS16b (FIGURE 33) thus energising relay RB/2. This relay will be maintained in operation by the action of LS24 (mounted on grouping mechanism) when LS16b opens due to transfer trolley moving away to the marshalling area. When the transfer trolley has reached the marshalling area LS15c is made so that a circuit is completed through to V20 (valve controlling raising and lowering of grouping mechanism by the motor 206) (see FIGURE 3).

The grouping mechanism is lowered into position over base layers and in doing so LS25 (FIGURES 29, 30) is opened to prevent any further movement of the lift which in its turn prevents movement of the transfer trolley.

The grouping mechanism once down will depress a valve, V21 (FIGURE 3), which controls the motor 202 (FIGURE 28) to obtain the grouping action. When the action is completed LS24 (FIGURE 33) will have been operated thus de-energising RB/2 and allowing grouping mechanism to be raised clear. The grouping mechanism action will be re-set by releasing V21 when grouping bars are clear of bricks and LS25 (see FIGURE 34 and FIGURE 3) will close when the frame is vertical.

A switch, LS27 (see FIGURES 16 and 34), is operated by a cam on cam disc 210 on indexing shaft 77 of marshalling conveyor when the marshalling conveyor has been indexed for the final row of a layer to be loaded. This switch LS27 (see FIGURE 34) makes in a circuit comprising LS25, LS28 and RD1, LS33b and the starter relay RG which is capable of energising the magnetic brake 253 (FIGURE 25) to release lift. The switch LS27 (see FIGURE 34) also makes in a circuit through to V6.

When the last row of bricks have been marshalled and V5 energised, the two circuits above also become live energising the electromagnet valve V6 and cutting off the supply of air to the cylinders 3 and 4 while energising the starter relay RG thereby releasing the brake and lowering the lift.

The lift in motion operates the following:

(a) Releases LS28 thus breaking its contacts "a" and making the contacts "b" so that the lift continues to move down with the relay RG being held under the action of LS28b, RD1 and LS33b.

(b) The layer selecting cam on lift which releases one of the switches 36 to 48 for layer just completed.

(c) All layer selection switches which are now open, thus V6 becomes de-energised and allows the indexing mechanism to index the marshalling conveyor to next row (i.e. first row of fresh layer). In indexing LS27 is opened and LS22 closed by cam on cam disc 210.

(d) Lift cam makes contact with next layer selection switch thus energising the correct stop 101.

(e) Lift having lowered one brick's length, LS28 is operated breaking its contact "b" and making contact "a." Lift stops due to LS27 being open.

This method of lowering is continued until top layers 11 or 23 have been marshalled.

When layer 11 has been marshalled the lift lowers as set out above, thus setting the marshalling stop 101 for layer 12 (i.e. bottom layer of the stack next to be produced). The layer section switch for layer 12, LS46, has a secondary pair of contacts (LS46b) situated in a by-pass circuit (FIGURE 34), which also make, the function of which is to enable the lift to move down to its lower limit where only eleven layers have been deposited. Layer 11 is transported as before and is lowered on to the stack on trolley.

As the gripper frames are lowered over the trolley, the switch controlling the contacts LS31a and LS31b (see FIGURE 34) is operated breaking LS31b and closing LS31a. RC/2 is energized via LS46b and LS31a and is maintained energised by the closing of its contacts RC2 when the gripper frames are in their uppermost position (LS31a is open). In doing so a circuit is completed through to the lift lowering relay RG, thus allowing the lift to lower without using LS27.

The length of the cam 214 (FIGURE 30) on the lift is such that it will keep LS46 depressed even when the lift reaches floor level.

On reaching floor level LS34 is operated; LS34a makes in the lift raise circuit (FIGURE 34). LS34b de-energises RG and RC2.

The operator can now remove a full trolley and insert any empty one whilst the marshalling mechanism is still marshalling the layer 12.

When a fresh trolley is in position and the lift gates are closed, the operator has but to wait for the indicator lamp 254 (FIGURE 34) to light (indicating that the layer has been marshalled) and press PB1.

On doing so RD4 (see FIGURE 34) is energised and is maintained by the action of RD3 and LS35 when PB1 is released whereupon contacts RD1 opens in "lift lower" circuit, RD2 closes in "lift raise" circuit, RD4 opens in PSW1 circuit (gripper unit).

The lift in moving up releases LS46, all layer selection switches are now open thus V6 is de-energised allowing indexing of marshalling conveyor, and bricks are allowed to run into the marshalling area without any electrical control. As the first row of layer 13 is eight bricks in length this lack of control presents no disadvantage other than in the event of the row filling before the lift is correctly positioned the feed in conveyor will continue to run.

The lift continuing upwards turns SW1 through 90° thus selecting the switches required for forming the next stack (note the cam 214 for operation of layer selection switches being hinged swings clear during upward motion).

When the lift reaches the highest point LS35 is opened and thus de-energising RD4.

When RD4 is de-energised RD1 makes in the "lift down" circuit; RD2 opens in "lift raise" circuit; RD3 opens in holding circuit; RD4 makes in PSW1 circuit.

The lift when in its highest position has been allowed to over-run the level at which it receives the first layer in consequence of which LS28b (see FIGURE 34) is made.

The lift therefore starts moving down making LS36 for marshalling to continue, and the lift stops when LS28b opens and LS28"a" makes.

When layer 23 is being marshalled, the by-pass circuit is held out of operation even though LS46 is depressed, due to SW1 distributing the current to the circuit for the top stack. So that it is not until layer 23 has been marshalled and the lift has moved down a layer normally to operate, LS48 for layer 1, that the by-pass circuit is energised.

LS46 and LS48 in both being depressed by the long cam 214 and connected into common circuit through to LS6 allow the current to pass via SW1, LS48, LS46a (see FIGURE 34) and LS46b.

This enables the lift to bottom as before and for the transfer of trolleys whilst layer 1 is being marshalled.

As previously indicated bricks are fed into the marshalling area in a single line and to achieve this single line from the supply of three presses the following method has been adopted: (see FIGURES 1, 4, 5, 6 and 7).

One squencing mechanism 11 is fitted per press but the timer unit is one per three presses.

Bricks are fed from the press down the gravity feed conveyor 10 to the sequencing mechanism shown in FIGURE 4 the first two bricks (one per row) of any number of bricks present on this conveyor coming to rest against the forward pair of stops 19. In this position the two switches LS29 and LS30 (FIGURE 32) will have operated, thus enabling the valve V19 to operate when the timer contacts TC1 are closed by the aforesaid cam mechanism 215 (FIGURE 2) operated by the conveyor 12. Thus the speed at which the sequence mechanism operates is controlled by the speed of the conveyor which in its turn is controlled by the weight of the bricks on conveyor 33.

Figure 32:
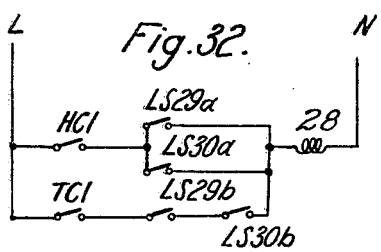
FIGURE 32 shows an electric circuit associated with the sequencing apparatus.

The "timer unit," set to operate slightly in advance of the production rate, will make a contact TC1 in each of the sequencing unit circuits (FIGURE 32).

Any of the units having both brick operated switches LS29, LS30 closed will energise their solenoid operated valve V19 this will hold-in via HC1 when the "timer" contact TC1 breaks.

The front stops 19 are raised and the rear stops 20 lower into the "frogs" of the two bricks immediately behind. The pushing cylinder 9, of motor 24 gives the two bricks in the unit a push to set them moving, and also to separate them from their neighbours in the event of any tendency to stick.

The bricks leave the unit and travel down until they tip and fall on to a moving conveyor 12 running at right angles to their previous direction of travel. Once on the conveyor they are carried clear of all the sequencing units before the timer switch TC1 next operates.

As the bricks leave the sequencing unit the two switches LS29 and LS30 would have been released, thus allowing the mechanism to re-set and allow the next two bricks to enter the unit. At the commencement of a cycle the leading bricks will have been arrested by the locating members 19 and in moving into contact with them will have closed the switches LS29a, LS29b, LS30a and LS30b, but electric supply cannot be fed to the solenoid 28 until the timing contact TC1 is closed by the rotating cam mechanism 215. This cam mechanism at the same time closes holding contact HC1. When TC1 is closed, the solenoid 28 is energized and the valve V19 is moved into a position in which the motor 21 raises the locating members 19 allowing the leading bricks to move out of the sequencing mechanism whereas the other locating members 20 descend into the frogs of the succeeding bricks.

Referring to FIGURE 7, air under pressure is supplied through a pipe P40. A pipe P41 is connected to exhaust. Thus, in the full-line position of the valve V19, air is being supplied to the upper part of the cylinder of the motor 21 and the piston rod 22 is in its extended position and the locating members 19 in their lowermost position. Also, air is being supplied through a pipe P42 to the left-hand end of the cylinder of motor 24 and the piston rod 25 and the cross bar 26 are in their retracted positions. When the solenoid 28 is energized, it overcomes the force of a spring S43 and valve V19 changes over to the position shown in dotted lines in which the underside of the cylinder of the motor 21 is connected to the supply pipe P40 and the upper end of the cylinder of the motor 21 is connected to the exhaust pipe P41, whereby the piston rod 22 and the locating members 19 are raised, releasing the leading pair of bricks. Pressure then builds up in the lower part of the cylinder of the motor 21 and in the pressure release valve 29 (FIG. 7) until the valve 29 releases air under pressure to the right-hand end of the cylinder of the motor 24 whereupon the piston rod 25 and the cross bar 26 move to their extended position and push the leading pair of bricks onto the conveyor 12. The speed of movement of the rod 25 is controllable by the restrictor 30.

Switch HC1 is arranged to remain closed for a period after switch TC1 has been opened by the cam mechanism so that the solenoid 28 remains energized until the leading pair of bricks move away from the switches LS29a, LS29b, LS30a and LS30b which then open whereupon the solenoid is de-energized.

When the solenoid is de-energized, the spring 43 changes the valve V19 back to the full line position and the locating members 19 move to their lowermost position. The next pair of bricks are released by the locating members 20 and move into a position in which they engage and close the switches LS29a, LS29b, LS30a and LS30b and engage the locating members 19 and the cycle is repeated.

In the event of one brick jamming it can be seen that the valve V19 will remain energised, thus preventing it from functioning until it has been serviced.

I claim:

1. An apparatus for setting bricks comprising a step by step moving marshalling platform, means for feeding bricks onto that platform so as to form a number of spaced rows with a predetermined number of bricks in each row, two gripper heads arranged side by side in the direction of the lengths of the said rows and each rotatable and movable in an up and down direction of a carriage frame, a lift at one end of the marshalling platform, a track arranged above the platform and extending above the lift, a transfer trolley movable along the track, a first motor on the trolley adapted to drive it along the tracks, a superstructure vertically movable on the trolley, a reciprocable motor mounted in the trolley and adapted to transmit vertical movement to the superstructure, horizontal guide rails on the superstructure, two carriages each including said carriage frame movable horizontally towards and away from one another on said guide rails, a further motor on said superstructure for imparting said horizontal movement to the carriages, said further motor comprising two cylinders fixed to a frame member at the bottom of said superstructure and between the two carriages with reciprocable plungers in said cylinders engaging said carriages and a lever pivotally connected at its center to said frame member with links pivotally connected between the ends of the levers and the two carriages whereby the movements of the two carriages are equalized, a gripper shaft rotatable about a vertical axis on each carriage, a rotary motor on each carriage coupled for imparting said rotary movement, inflatable bolsters on said gripper frames adapted to grip the bricks in the row of bricks on the marshalling platform, pneumatic means for controlling the gripping action by inflating and deflating said bolsters, control means energizing said further motor to move the gripper heads apart rotating them and returning them together selectively on different operation cycles while each of said gripper heads carries a number of grippers for half the number of bricks in said rows, means for moving the lift in an up and down direction and means for raising and lowering said gripper frames responsive to proper pressure in said bolsters, wherein the pneumatic means for the grippers has a control adjacent the marshalling platform actuated by downward movement of a part of said frame whereby the grippers close on the bricks when the heads are first lowered, and including another control adjacent the means for moving the lift arranged to release the gripper when the heads again descend, and wherein a control for the reciprocable motor on the trolley is arranged to come into operation when said gripper heads rise from the receiving platform whereby the heads are separated, and wherein the motor adapted to rotate each gripper head is provided with a control which is actuated by the outlined movement of the frames whereby the frames are rotated through 90°, and wherein said control for the first said motor is arranged to be actuated by the rotational movement of said frames when approaching the end of their rotation.

2. An apparatus according to claim 1 wherein the means for effecting up and down movement of said transporter comprise a lift which carries said transporter and is driven through a transmission by a reversible electric motor controlled by a moving part of the apparatus, and means are provided for bringing said motor into circuit with a source of supply so as to rotate in a direction to lower the lift by a moving part of the drive for the marshalling means after a layer of bricks has been finally marshalled and delivered onto the transporter or carrier and downward movement of which lift is arrested after a travel corresponding to the height of a layer of bricks and an electric motor reversing circuit is brought into operation by a switch arranged to be closed by the lift at its lowest limit of travel.

References Cited in the file of this patent

UNITED STATES PATENTS

| | | |
|---|---|---|
| 1,490,235 | Smith | Apr. 15, 1924 |
| 1,492,864 | Straight | May 6, 1924 |
| 1,510,717 | Straight | Oct. 7, 1924 |
| 2,710,696 | Fontaine | June 14, 1955 |
| 2,903,901 | MacDonald | Sept. 14, 1959 |
| 2,928,559 | Mosely | Mar. 15, 1960 |
| 2,955,717 | Segur | Oct. 11, 1960 |
| 2,980,265 | Johnson | Apr. 18, 1961 |